US008974567B2

(12) United States Patent
Verdegan et al.

(10) Patent No.: US 8,974,567 B2
(45) Date of Patent: Mar. 10, 2015

(54) ROTATING COALESCER WITH KEYED DRIVE

(75) Inventors: Barry M. Verdegan, Stoughton, WI (US); Howard E. Tews, Beloit, WI (US); Roger L. Zoch, McFarland, WI (US); Bradley A. Smith, Madison, WI (US); Kwok-Lam Ng, Madison, WI (US); Benoit Le Roux, Fouesnant (FR); Chirag D. Parikh, Madison, WI (US)

(73) Assignee: Cummins Filtration IP Inc., Columbus, IN (US)

( * ) Notice: Subject to any disclaimer, the term of this patent is extended or adjusted under 35 U.S.C. 154(b) by 455 days.

(21) Appl. No.: 13/167,820

(22) Filed: Jun. 24, 2011

(65) Prior Publication Data

US 2011/0252974 A1 Oct. 20, 2011

Related U.S. Application Data

(63) Continuation-in-part of application No. 12/969,742, filed on Dec. 16, 2010, now Pat. No. 8,794,222, and a continuation-in-part of application No. 12/969,755, filed on Dec. 16, 2010, now Pat. No. 8,807,097.

(51) Int. Cl. (Continued)
*B01D 45/14* (2006.01)
*F01M 13/04* (2006.01)
(Continued)

(52) U.S. Cl.
CPC ......... *F01M 13/04* (2013.01); *F01M 2013/027* (2013.01); *F01M 2013/0422* (2013.01); *F01M 2013/0438* (2013.01); *F02M 25/06* (2013.01); *Y10S 55/19* (2013.01)
USPC ............ 55/400; 55/406; 55/DIG. 19; 95/270; 95/277; 123/41.86; 123/572; 123/574

(58) Field of Classification Search
CPC ..................... B01D 2201/29; B01D 2201/291; B01D 2201/293; B01D 2201/295; B01D 2201/30; B01D 2201/301; B01D 2201/305; B01D 2201/36; B01D 2201/40; B01D 2201/4015; B01D 2201/4023; B01D 2201/4046; B01D 2201/4053; B01D 2201/4061; B01D 2201/4084; B01D 2201/4092; F01M 13/04; F01M 2013/027; F01M 25/06; F01M 2013/0438; F01M 2013/0422
USPC ....... 55/400–409, 434, DIG. 19; 95/270, 277; 96/155, 177, 178, 204, 216, 219; 123/41.86, 43 R, 86, 572–574; 210/359–382, 780, 784
See application file for complete search history.

(56) References Cited

U.S. PATENT DOCUMENTS 630,365 A 8/1899 LaPlace
881,723 A 3/1908 Scheibe (Continued)

FOREIGN PATENT DOCUMENTS

BE 1 011 567 11/1999
CN 1671952 9/2005

(Continued)

OTHER PUBLICATIONS

Haldex, Alfdex Oil Mist Separator, www.haldex.com, Stockholm, Sweden, Sep. 2004, 6 pgs.

(Continued)

*Primary Examiner* — Duane Smith
*Assistant Examiner* — Sonji Turner
(74) *Attorney, Agent, or Firm* — Foley & Lardner LLP

(57) ABSTRACT

A gas-liquid rotating coalescer includes first and second sets of one or more detent surfaces on a rotary drive member and a driven annular rotating coalescing filter element which engagingly interact in interlocking mating keyed relation to effect rotation of the coalescing filter element by the rotary drive member. Designated operation of the coalescer requires that the coalescing filter element include the second set of detent surfaces. A coalescing filter element missing the second set of detent surfaces will not effect the noted designated operation.

71 Claims, 22 Drawing Sheets

Related U.S. Application Data

(60) Provisional application No. 61/383,787, filed on Sep. 17, 2010, provisional application No. 61/383,793, filed on Sep. 17, 2010, provisional application No. 61/298,630, filed on Jan. 27, 2010, provisional application No. 61/298,635, filed on Jan. 27, 2010, provisional application No. 61/359,192, filed on Jun. 28, 2010, provisional application No. 61/383,790, filed on Sep. 17, 2010, provisional application No. 61/383,790, filed on Sep. 17, 2010.

(51) Int. Cl.
*F01M 13/02* (2006.01)
*F02M 25/06* (2006.01)

(56) References Cited

U.S. PATENT DOCUMENTS

| | | | | | |
|---|---|---|---|---|---|
| 2,104,683 | A | | 1/1938 | Rosen Hugo Van et al. | |
| 2,443,875 | A | | 6/1948 | Spangenberger | |
| 2,713,960 | A | | 7/1955 | Siegal | |
| 2,714,960 | A | | 8/1955 | Schmid | |
| 2,795,291 | A | | 6/1957 | Pierce | |
| 3,073,516 | A | | 1/1963 | Glasson | |
| 3,234,716 | A | | 2/1966 | Roger et al. | |
| 3,289,397 | A | | 12/1966 | Schonewald et al. | |
| 3,299,335 | A | | 1/1967 | Wessels | |
| 3,333,703 | A | * | 8/1967 | Scavuzzo et al. | 210/232 |
| 3,343,342 | A | | 9/1967 | Du | |
| 3,363,771 | A | | 1/1968 | Walters | |
| 3,447,290 | A | | 6/1969 | Flory | |
| 3,631,272 | A | | 12/1971 | Kirii et al. | |
| 3,753,492 | A | | 8/1973 | Aiello et al. | |
| 3,857,687 | A | * | 12/1974 | Hamilton et al. | 55/337 |
| 3,935,487 | A | | 1/1976 | Czerniak | |
| 4,138,234 | A | * | 2/1979 | Kubesa | 55/374 |
| 4,189,310 | A | | 2/1980 | Hotta | |
| 4,223,909 | A | | 9/1980 | Danner et al. | |
| 4,249,221 | A | | 2/1981 | Cox et al. | |
| 4,288,030 | A | | 9/1981 | Beazley et al. | |
| 4,311,933 | A | | 1/1982 | Riggs et al. | |
| 4,329,968 | A | | 5/1982 | Ishikawa et al. | |
| 4,411,675 | A | | 10/1983 | De Castella | |
| 4,482,365 | A | | 11/1984 | Roach | |
| 4,561,409 | A | | 12/1985 | Fernandez | |
| 4,714,139 | A | | 12/1987 | Lorenz et al. | |
| 4,871,455 | A | * | 10/1989 | Terhune et al. | 210/232 |
| 4,908,050 | A | | 3/1990 | Nagashima et al. | |
| 4,922,604 | A | | 5/1990 | Marshall et al. | |
| 4,981,502 | A | | 1/1991 | Gottschalk | |
| 5,035,797 | A | * | 7/1991 | Janik | 210/232 |
| 5,045,192 | A | * | 9/1991 | Terhune | 210/232 |
| 5,090,873 | A | | 2/1992 | Fain | |
| 5,095,238 | A | | 3/1992 | Suzuki et al. | |
| 5,171,430 | A | | 12/1992 | Beach et al. | |
| 5,205,848 | A | | 4/1993 | Blanc et al. | |
| 5,229,671 | A | | 7/1993 | Neidhard et al. | |
| 5,300,223 | A | * | 4/1994 | Wright | 210/232 |
| 5,342,519 | A | * | 8/1994 | Friedmann et al. | 210/232 |
| 5,429,101 | A | * | 7/1995 | Uebelhoer et al. | 123/572 |
| 5,450,835 | A | | 9/1995 | Wagner | |
| 5,471,966 | A | | 12/1995 | Feuling | |
| 5,536,289 | A | | 7/1996 | Spies et al. | |
| 5,538,626 | A | | 7/1996 | Baumann | |
| 5,548,893 | A | | 8/1996 | Koelfgen | |
| 5,549,821 | A | | 8/1996 | Bounnakhom et al. | |
| 5,556,542 | A | | 9/1996 | Berman et al. | |
| 5,575,511 | A | * | 11/1996 | Kroha et al. | 285/61 |
| 5,643,448 | A | | 7/1997 | Martin et al. | |
| 5,681,461 | A | | 10/1997 | Gullett et al. | |
| 5,685,985 | A | | 11/1997 | Brown et al. | |
| 5,702,602 | A | | 12/1997 | Brown et al. | |
| 5,737,378 | A | | 4/1998 | Ballas et al. | |
| 5,738,785 | A | | 4/1998 | Brown et al. | |
| 5,755,842 | A | | 5/1998 | Patel et al. | |
| 5,762,671 | A | * | 6/1998 | Farrow et al. | 55/496 |
| 5,770,065 | A | | 6/1998 | Popoff et al. | |
| 5,837,137 | A | * | 11/1998 | Janik | 210/232 |
| 5,846,416 | A | | 12/1998 | Gullett | |
| 5,911,213 | A | | 6/1999 | Ahlborn et al. | |
| 6,006,924 | A | * | 12/1999 | Sandford | 210/440 |
| 6,019,717 | A | | 2/2000 | Herman | |
| 6,068,763 | A | * | 5/2000 | Goddard | 210/130 |
| 6,123,061 | A | | 9/2000 | Baker et al. | |
| 6,139,595 | A | | 10/2000 | Herman et al. | |
| 6,139,738 | A | | 10/2000 | Maxwell | |
| 6,146,527 | A | * | 11/2000 | Oelschlaegel | 210/232 |
| 6,152,120 | A | * | 11/2000 | Julazadeh | 123/572 |
| 6,213,929 | B1 | | 4/2001 | May | |
| 6,281,319 | B1 | | 8/2001 | Mentak | |
| 6,364,822 | B1 | | 4/2002 | Herman et al. | |
| 6,506,302 | B2 | * | 1/2003 | Janik | 210/232 |
| 6,517,612 | B1 | * | 2/2003 | Crouch et al. | 95/277 |
| 6,527,821 | B2 | | 3/2003 | Liu et al. | |
| 6,640,792 | B2 | * | 11/2003 | Harvey et al. | 123/572 |
| 6,701,580 | B1 | | 3/2004 | Bandyopadhyay | |
| 6,709,477 | B1 | | 3/2004 | Haakansson et al. | |
| 6,752,924 | B2 | | 6/2004 | Gustafson et al. | |
| 6,755,896 | B2 | | 6/2004 | Szepessy et al. | |
| 6,821,319 | B1 | | 11/2004 | Moberg et al. | |
| 6,858,056 | B2 | | 2/2005 | Kwan | |
| 6,893,478 | B2 | | 5/2005 | Care et al. | |
| 6,925,993 | B1 | | 8/2005 | Eliasson et al. | |
| 6,986,805 | B2 | * | 1/2006 | Gieseke et al. | 95/273 |
| 7,000,894 | B2 | | 2/2006 | Olson et al. | |
| 7,022,163 | B2 | | 4/2006 | Olsson et al. | |
| 7,081,145 | B2 | | 7/2006 | Gieseke et al. | |
| 7,104,239 | B2 | | 9/2006 | Kawakubo et al. | |
| 7,152,589 | B2 | | 12/2006 | Ekeroth et al. | |
| 7,185,643 | B2 | | 3/2007 | Gronberg et al. | |
| 7,235,177 | B2 | | 6/2007 | Herman et al. | |
| 7,258,111 | B2 | | 8/2007 | Shieh et al. | |
| 7,294,948 | B2 | | 11/2007 | Wasson et al. | |
| 7,338,546 | B2 | | 3/2008 | Eliasson et al. | |
| 7,377,271 | B2 | | 5/2008 | Hoffmann et al. | |
| 7,396,373 | B2 | | 7/2008 | Lagerstedt et al. | |
| 7,465,341 | B2 | | 12/2008 | Eliasson | |
| 7,473,034 | B2 | | 1/2009 | Saito et al. | |
| 7,614,390 | B2 | | 11/2009 | Holzmann et al. | |
| 7,723,887 | B2 | | 5/2010 | Yang et al. | |
| 7,824,459 | B2 | | 11/2010 | Borgstrom et al. | |
| 8,177,875 | B2 | | 5/2012 | Rogers et al. | |
| 8,499,749 | B2 | * | 8/2013 | Mosset et al. | 123/573 |
| 8,499,750 | B2 | | 8/2013 | Koyamaishi et al. | |
| 2001/0012814 | A1 | | 8/2001 | May et al. | |
| 2003/0024870 | A1 | | 2/2003 | Reinhart | |
| 2003/0034016 | A1 | | 2/2003 | Harvey et al. | |
| 2003/0233939 | A1 | | 12/2003 | Szepessy et al. | |
| 2004/0168415 | A1 | | 9/2004 | Hilpert et al. | |
| 2004/0206083 | A1 | | 10/2004 | Okuyama et al. | |
| 2004/0214710 | A1 | | 10/2004 | Herman et al. | |
| 2004/0226442 | A1 | | 11/2004 | Olsson et al. | |
| 2005/0060970 | A1 | | 3/2005 | Polderman | |
| 2005/0120685 | A1 | | 6/2005 | Fischer et al. | |
| 2005/0223687 | A1 | | 10/2005 | Miller et al. | |
| 2006/0048761 | A1 | | 3/2006 | Ekeroth et al. | |
| 2006/0090738 | A1 | | 5/2006 | Hoffmann et al. | |
| 2006/0145555 | A1 | | 7/2006 | Petro et al. | |
| 2006/0162305 | A1 | * | 7/2006 | Reid | 55/498 |
| 2007/0062887 | A1 | | 3/2007 | Schwandt et al. | |
| 2007/0084194 | A1 | | 4/2007 | Holm | |
| 2007/0107703 | A1 | | 5/2007 | Natkin | |
| 2007/0163215 | A1 | | 7/2007 | Lagerstadt | |
| 2007/0289632 | A1 | | 12/2007 | Della Casa | |
| 2008/0009402 | A1 | | 1/2008 | Kane et al. | |
| 2008/0250772 | A1 | | 10/2008 | Becker et al. | |
| 2008/0264251 | A1 | | 10/2008 | Szepessy | |
| 2008/0290018 | A1 | | 11/2008 | Carew | |
| 2009/0000258 | A1 | | 1/2009 | Carlsson et al. | |
| 2009/0013658 | A1 | | 1/2009 | Borgstrom et al. | |
| 2009/0025562 | A1 | | 1/2009 | Hallgren et al. | |
| 2009/0025662 | A1 | | 1/2009 | Herman et al. | |
| 2009/0050121 | A1 | | 2/2009 | Holzmann et al. | |

(56) References Cited

U.S. PATENT DOCUMENTS

| | | | | |
|---|---|---|---|---|
| 2009/0126324 | A1 | 5/2009 | Smith et al. | |
| 2009/0178964 | A1 | 7/2009 | Cline et al. | |
| 2009/0186752 | A1 | 7/2009 | Isaksson et al. | |
| 2009/0223496 | A1 | 9/2009 | Borgstrom et al. | |
| 2009/0249756 | A1 * | 10/2009 | Schrage et al. | 55/498 |
| 2009/0266235 | A1 | 10/2009 | Kane et al. | |
| 2009/0272085 | A1 * | 11/2009 | Gieseke et al. | 55/502 |
| 2010/0011723 | A1 | 1/2010 | Szepessy et al. | |
| 2010/0043734 | A1 | 2/2010 | Holzmann et al. | |
| 2010/0180854 | A1 | 7/2010 | Baumann et al. | |
| 2010/0229537 | A1 | 9/2010 | Holm | |
| 2011/0005160 | A1 | 1/2011 | Nihei | |
| 2011/0017155 | A1 | 1/2011 | Jacob | |
| 2011/0056455 | A1 | 3/2011 | Koyamaishi et al. | |
| 2011/0180051 | A1 * | 7/2011 | Schwandt et al. | 123/573 |
| 2011/0180052 | A1 * | 7/2011 | Schwandt et al. | 123/573 |
| 2011/0247309 | A1 * | 10/2011 | Smith et al. | 55/447 |
| 2011/0252974 | A1 * | 10/2011 | Verdegan et al. | 96/178 |
| 2011/0281712 | A1 | 11/2011 | Schlamann et al. | |

FOREIGN PATENT DOCUMENTS

| | | |
|---|---|---|
| CN | 2809233 | 8/2006 |
| CN | 1961139 | 5/2007 |
| CN | 1961139 A | 5/2007 |
| CN | 101189414 | 5/2008 |
| CN | 101549331 | 10/2009 |
| EP | 844012 | 5/1998 |
| EP | 0880987 | 12/1998 |
| WO | WO-2009/005355 | 1/2009 |
| WO | WO-2009/138872 A1 | 11/2009 |
| WO | WO-2010/051994 | 5/2010 |

OTHER PUBLICATIONS

Non-final Office Action received for U.S. Appl. No. 13/167,814 dated Oct. 7, 2013.

Example of Simplified Squirrel Cage Motor, www.animations.physics.unsw.edu.au, pg. 5, website visited Apr. 25, 2011.

Final Office Action received for U.S. Appl. No. 12/969,742 dated Dec. 23, 2013.

Final Office Action received for U.S. Appl. No. 12/969,742 dated May 20, 2013.

Non-final Office Action received for U.S. Appl. No. 12/969,742 dated Aug. 27, 2013.

Non-final Office Action received for U.S. Appl. No. 12/969,742 dated Feb. 13, 2013.

Non-final Office Action received for U.S. Appl. No. 12/969,755 dated Jan. 29, 2013.

Non-final Office Action received for U.S. Appl. No. 13/167,814 dated Jun. 18, 2013.

* cited by examiner

ROTATING COALESCER WITH KEYED DRIVE

CROSS-REFERENCE TO RELATED APPLICATIONS

The present application claims the benefit of and priority from Provisional U.S. Patent Application No. 61/383,787, filed Sep. 17, 2010, and Provisional U.S. Patent Application No. 61/383,793, filed Sep. 17, 2010. The present application is a continuation-in-part of U.S. patent application Ser. No. 12/969,742, filed Dec. 16, 2010, and U.S. patent application Ser. No. 12/969,755, filed Dec. 16, 2010. Each of the '742 and '755 applications claims the benefit of and priority from Provisional U.S. Patent Application No. 61/298,630, filed Jan. 27, 2010, Provisional U.S. Patent Application No. 61/298,635, filed Jan. 27, 2010, Provisional U.S. Patent Application No. 61/359,192, filed Jun. 28, 2010, Provisional U.S. Patent Application No. 61/383,787, filed Sep. 17, 2010, Provisional U.S. Patent Application No. 61/383,790, filed Sep. 17, 2010, and Provisional U.S. Patent Application No. 61/383,793, filed Sep. 17, 2010. All of the above are incorporated herein by reference.

BACKGROUND AND SUMMARY

Parent Applications

The '742 and '755 parent applications relate to internal combustion engine crankcase ventilation separators, particularly coalescers. Internal combustion engine crankcase ventilation separators are known in the prior art. One type of separator uses inertial impaction air-oil separation for removing oil particles from the crankcase blowby gas or aerosol by accelerating the blowby gas stream to high velocities through nozzles or orifices and directing same against an impactor, causing a sharp directional change effecting the oil separation. Another type of separator uses coalescence in a coalescing filter for removing oil droplets. The noted parent inventions arose during continuing development efforts in the latter noted air-oil separation technology, namely removal of oil from the crankcase blowby gas stream by coalescence using a coalescing filter.

Present Application

The present invention arose during continuing development efforts in gas-liquid separation technology, including the above noted technology, and including a rotating coalescer separating gas from a gas-liquid mixture, including air-oil and other gas-liquid mixtures.

In one embodiment, the present disclosure provides an authentication system ensuring that during maintenance servicing, the rotating coalescing filter element must be replaced only by an authorized replacement element, to ensure designated operation and performance, and that a nonauthorized aftermarket replacement element will not provide the noted designated operation and performance. In one embodiment, this ensures that an internal combustion engine being protected by a crankcase ventilation coalescer will receive at least the minimal level of protection from gas-borne contaminant that is necessary to achieve target levels for engine reliability and performance.

Applicant notes commonly owned co-pending U.S. patent application Ser. No. 13/167,814, filed on even date herewith, for another disclosure preventing use of a non-authorized replacement element during maintenance servicing.

BRIEF DESCRIPTION OF THE DRAWINGS

Parent Applications

FIG. 1 is a sectional view of a coalescing filter assembly.

FIG. 2 is a sectional view of another coalescing filter assembly.

FIG. 3 is like FIG. 2 and shows another embodiment.

FIG. 4 is a sectional view of another coalescing filter assembly.

FIG. 5 is a schematic view illustrating operation of the assembly of FIG. 4.

FIG. 6 is a schematic system diagram illustrating an engine intake system.

FIG. 7 is a schematic diagram illustrating a control option for the system of FIG. 6.

FIG. 8 is a flow diagram illustrating an operational control for the system of FIG. 6.

FIG. 9 is like FIG. 8 and shows another embodiment.

FIG. 10 is a schematic sectional view show a coalescing filter assembly.

FIG. 11 is an enlarged view of a portion of FIG. 10.

FIG. 12 is a schematic sectional view of a coalescing filter assembly.

FIG. 13 is a schematic sectional view of a coalescing filter assembly.

FIG. 14 is a schematic sectional view of a coalescing filter assembly.

FIG. 15 is a schematic sectional view of a coalescing filter assembly.

FIG. 16 is a schematic sectional view of a coalescing filter assembly.

FIG. 17 is a schematic view of a coalescing filter assembly.

FIG. 18 is a schematic sectional view of a coalescing filter assembly.

FIG. 19 is a schematic diagram illustrating a control system.

FIG. 20 is a schematic diagram illustrating a control system.

FIG. 21 is a schematic diagram illustrating a control system.

Present Application

Figure 22:
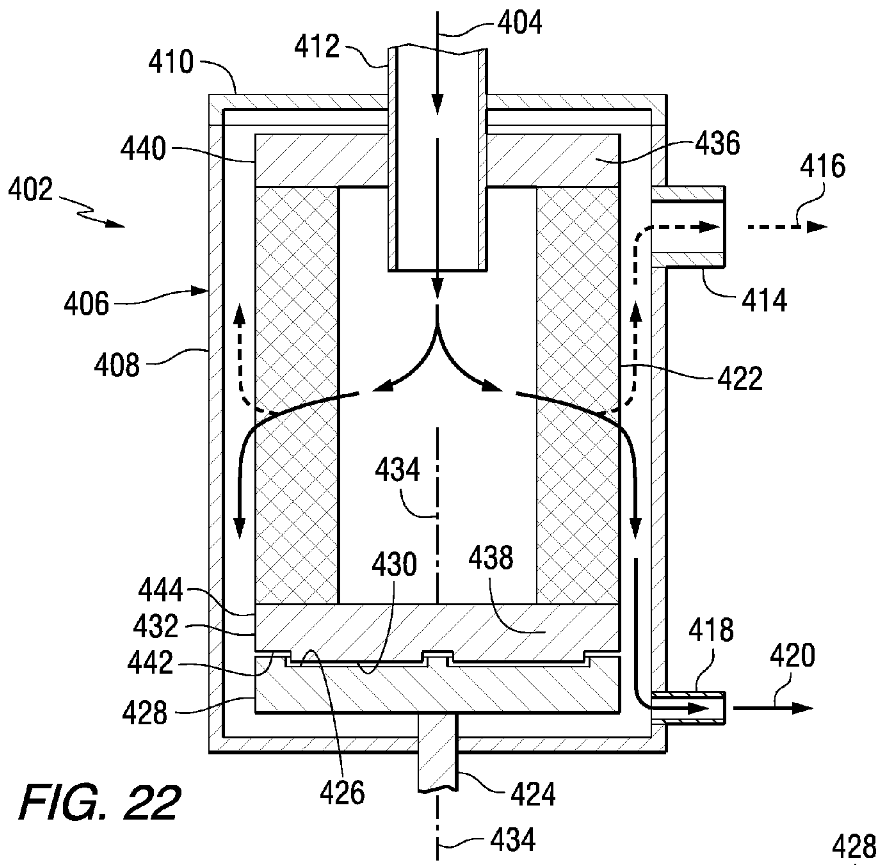

FIG. 22 is a schematic sectional view of a coalescing filter assembly.

Figure 23:
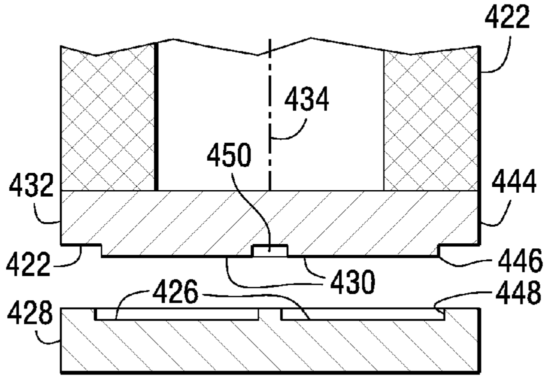

FIG. 23 is an exploded view of a portion of FIG. 22.

Figure 24:
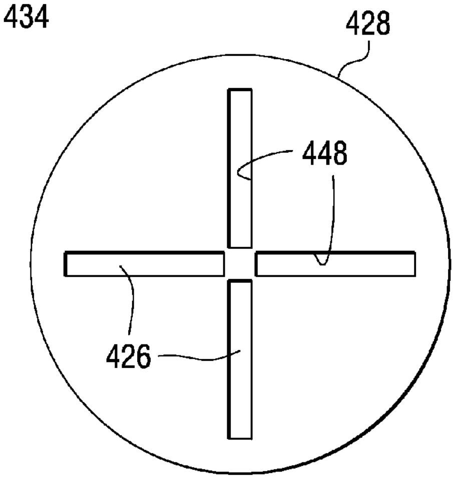

FIG. 24 is a top view of a component of FIG. 23.

Figure 25:
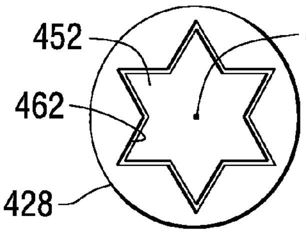

FIG. 25 is like FIG. 24 and shows another embodiment.

Figure 26:
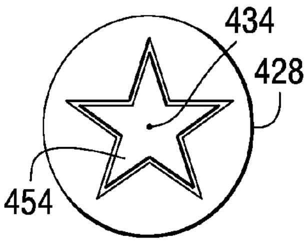

FIG. 26 is like FIG. 24 and shows another embodiment.

Figure 27:
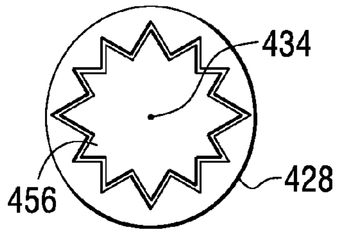

FIG. 27 is like FIG. 24 and shows another embodiment.

Figure 28:
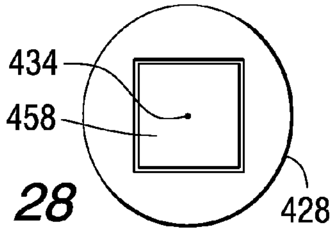

FIG. 28 is like FIG. 24 and shows another embodiment.

Figure 29:
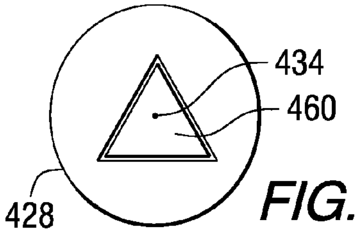

FIG. 29 is like FIG. 24 and shows another embodiment.

Figure 30:
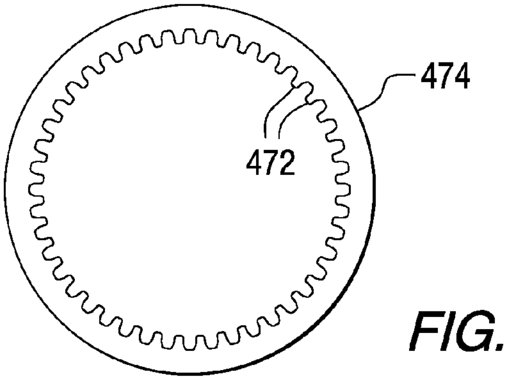

FIG. 30 is like FIG. 24 and shows another embodiment.

Figure 31:
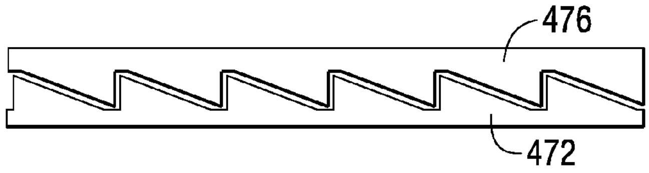

FIG. 31 is a side view showing another embodiment of a portion of FIG. 22.

Figure 32:
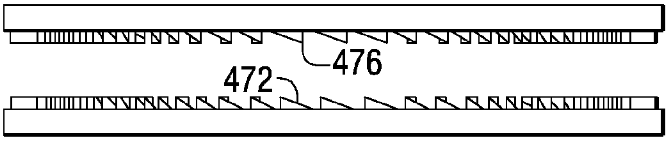

FIG. 32 is like FIG. 23 and shows another embodiment.

Figure 33:
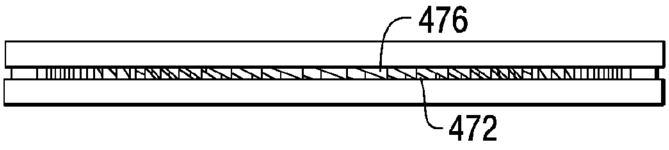

FIG. 33 is an assembled view of the components of FIG. 32.

Figure 34:
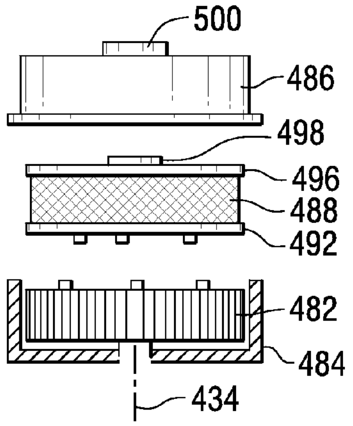

FIG. 34 is like FIG. 23 and shows another embodiment.

Figure 35:
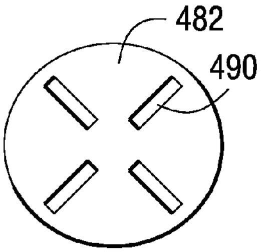

FIG. 35 is like FIG. 24 and shows another embodiment.

Figure 36:
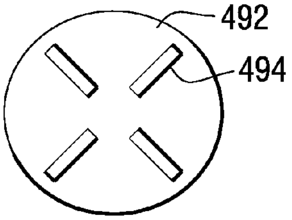

FIG. 36 is a view from below of a component of FIG. 34.

Figure 37:
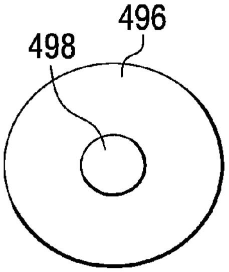

FIG. 37 is a top view of a component of FIG. 34.

Figure 38:
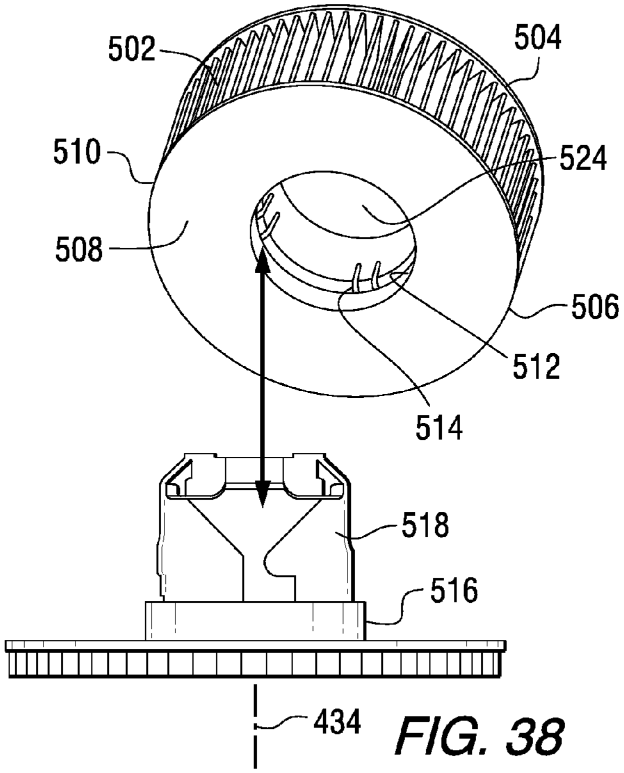

FIG. 38 is an exploded view showing another embodiment.

Figure 39:
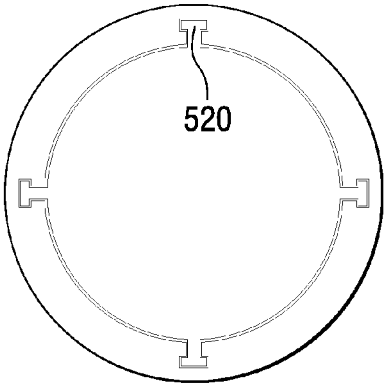

FIG. 39 is like FIG. 30 and shows another embodiment.

Figure 40:
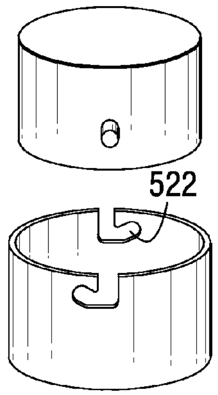

FIG. 40 is an exploded view showing another embodiment.

Figure 41:
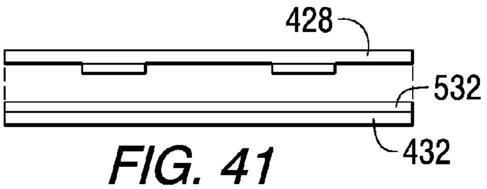

FIG. 41 is like FIG. 32 and shows another embodiment.

Figure 42:
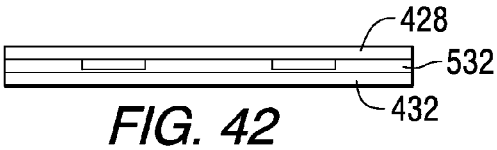

FIG. 42 is an assembled view of the components of FIG. 41.

Figure 43:
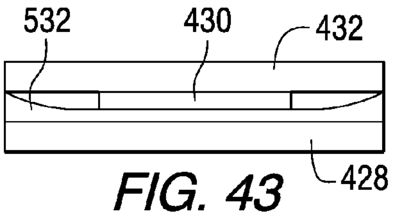

FIG. 43 is like FIG. 42 and shows another embodiment.

Figure 44:
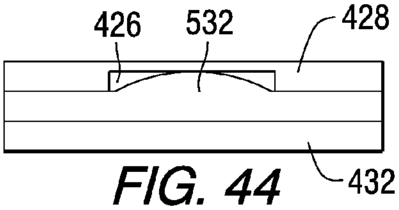

FIG. 44 is like FIG. 42 and shows another embodiment.

Figure 45:
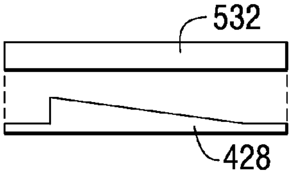

FIG. 45 is like FIG. 41 and shows another embodiment.

Figure 46:
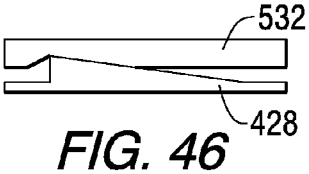

FIG. 46 is an assembled view of the components of FIG. 45.

Figure 47:
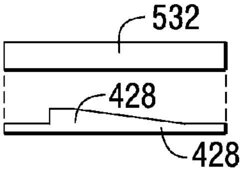

FIG. 47 is like FIG. 41 and shows another embodiment.

Figure 48:
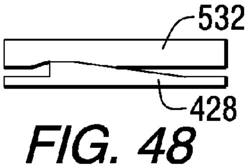

FIG. 48 is an assembled view of the components of FIG. 47.

Figure 49:
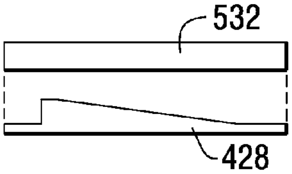

FIG. 49 is like FIG. 41 and shows another embodiment.

Figure 50:
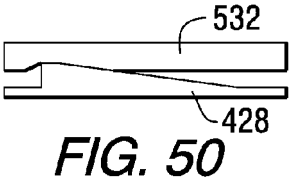

FIG. 50 is an assembled view of the components of FIG. 49.

Figure 51:
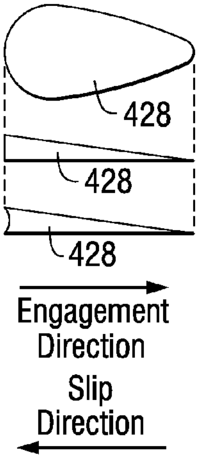

FIG. 51 is an exploded view showing another embodiment.

Figure 52:
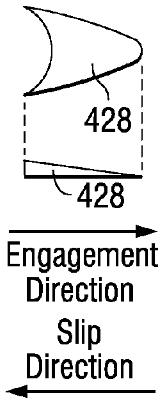

FIG. 52 is an exploded view showing another embodiment.

Figure 53:
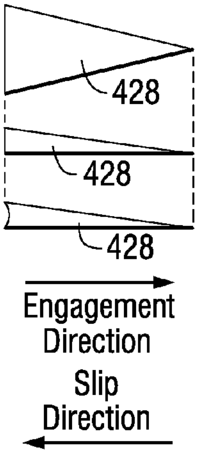

FIG. 53 is an exploded view showing another embodiment.

Figure 54:
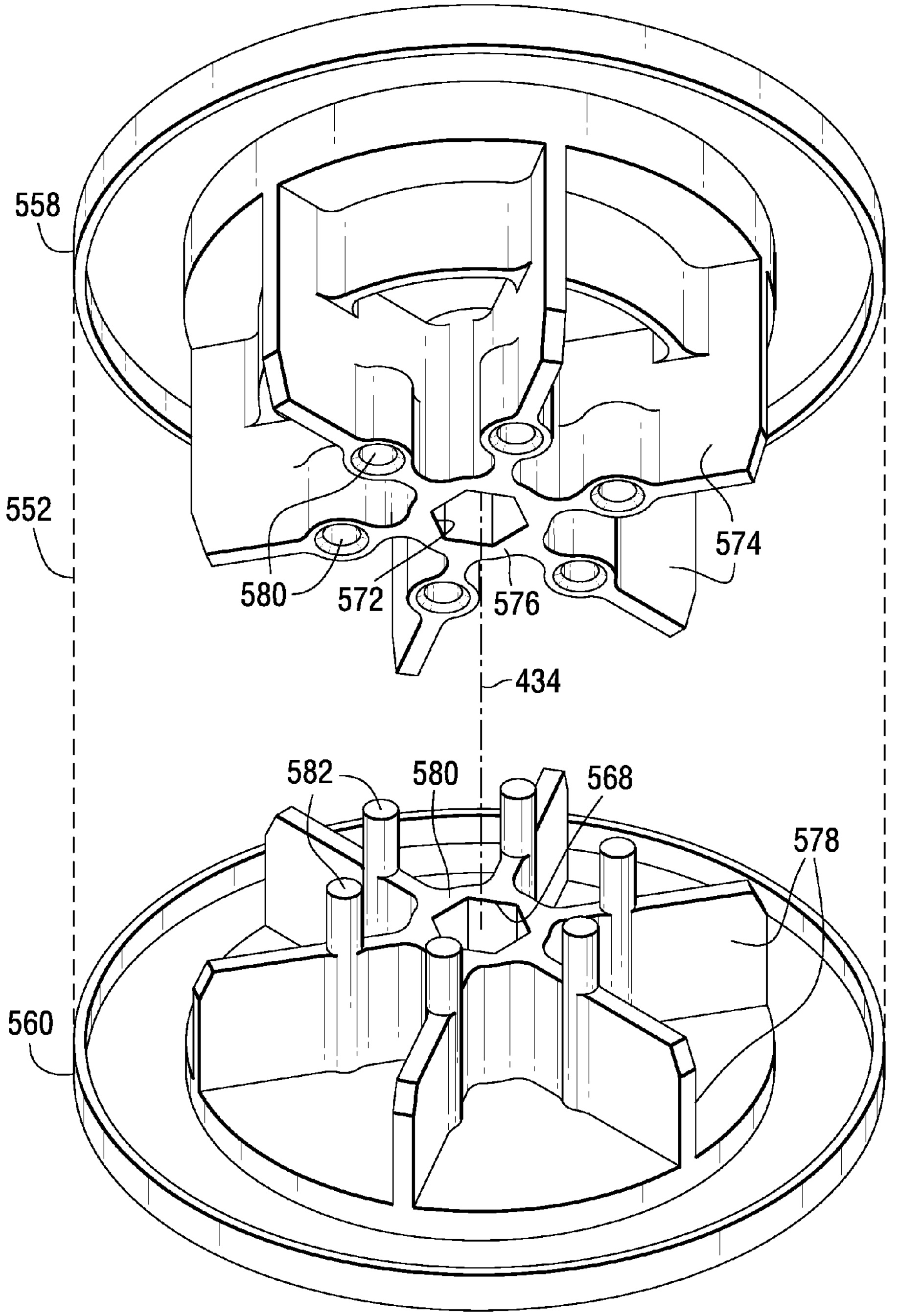

FIG. 54 is an exploded perspective view showing another embodiment.

Figure 55:
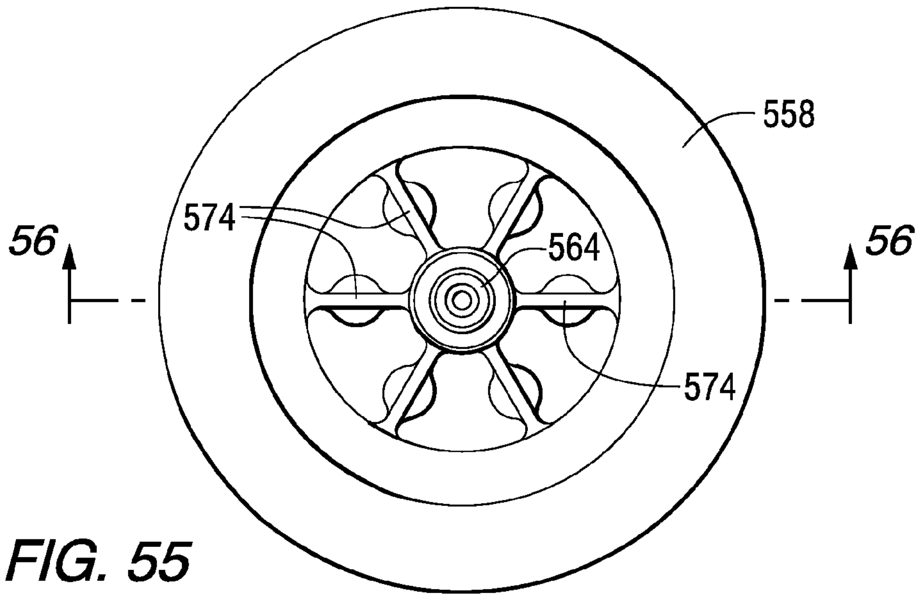

FIG. 55 is a top view showing the components of FIG. 54.

Figure 56:
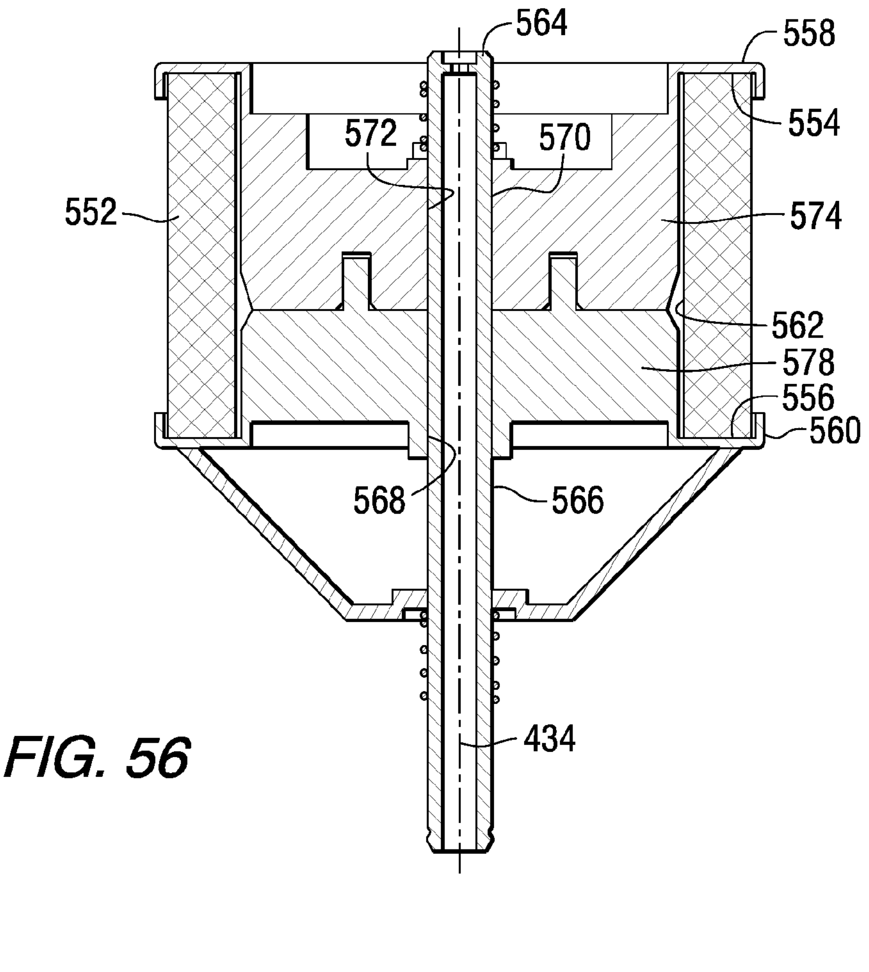

FIG. 56 is a sectional assembly view taken along line 56-56 of FIG. 55.

DETAILED DESCRIPTION

Parent Applications

The following description of FIGS. 1-21 is taken from commonly owned co-pending parent U.S. patent application Ser. No. 12/969,742, filed Dec. 16, 2010, which shares a common specification with commonly owned co-pending parent U.S. patent application Ser. No. 12/969,755, filed Dec. 16, 2010.

Figure 1:
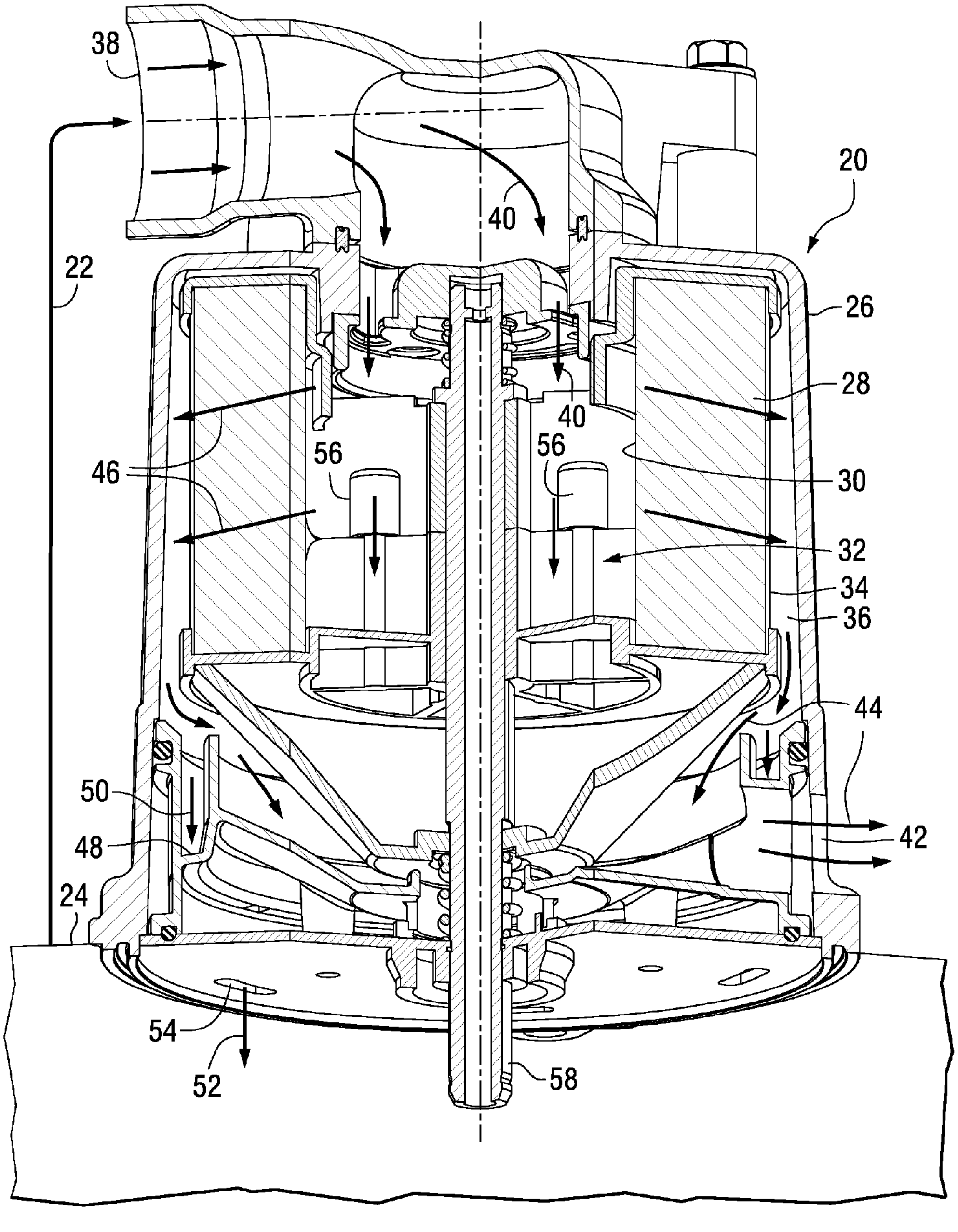
FIGS. 1-21 are taken from the noted parent '742 and '755 applications.

FIG. 1 shows an internal combustion engine crankcase ventilation rotating coalescer 20 separating air from oil in blowby gas 22 from engine crankcase 24. A coalescing filter assembly 26 includes an annular rotating coalescing filter element 28 having an inner periphery 30 defining a hollow interior 32, and an outer periphery 34 defining an exterior 36. An inlet port 38 supplies blowby gas 22 from crankcase 24 to hollow interior 32 as shown at arrows 40. An outlet port 42 delivers cleaned separated air from the noted exterior zone 36 as shown at arrows 44. The direction of blowby gas flow is inside-out, namely radially outwardly from hollow interior 32 to exterior 36 as shown at arrows 46. Oil in the blowby gas is forced radially outwardly from inner periphery 30 by centrifugal force, to reduce clogging of the coalescing filter element 28 otherwise caused by oil sitting on inner periphery 30. This also opens more area of the coalescing filter element to flow-through, whereby to reduce restriction and pressure drop. Centrifugal force drives oil radially outwardly from inner periphery 30 to outer periphery 34 to clear a greater volume of coalescing filter element 28 open to flow-through, to increase coalescing capacity. Separated oil drains from outer periphery 34. Drain port 48 communicates with exterior 36 and drains separated oil from outer periphery 34 as shown at arrow 50, which oil may then be returned to the engine crankcase as shown at arrow 52 from drain 54.

Centrifugal force pumps blowby gas from the crankcase to hollow interior 32. The pumping of blowby gas from the crankcase to hollow interior 32 increases with increasing speed of rotation of coalescing filter element 28. The increased pumping of blowby gas 22 from crankcase 24 to hollow interior 32 reduces restriction across coalescing filter element 28. In one embodiment, a set of vanes may be provided in hollow interior 32 as shown in dashed line at 56, enhancing the noted pumping. The noted centrifugal force creates a reduced pressure zone in hollow interior 32, which reduced pressure zone sucks blowby gas 22 from crankcase 24.

Figure 2:
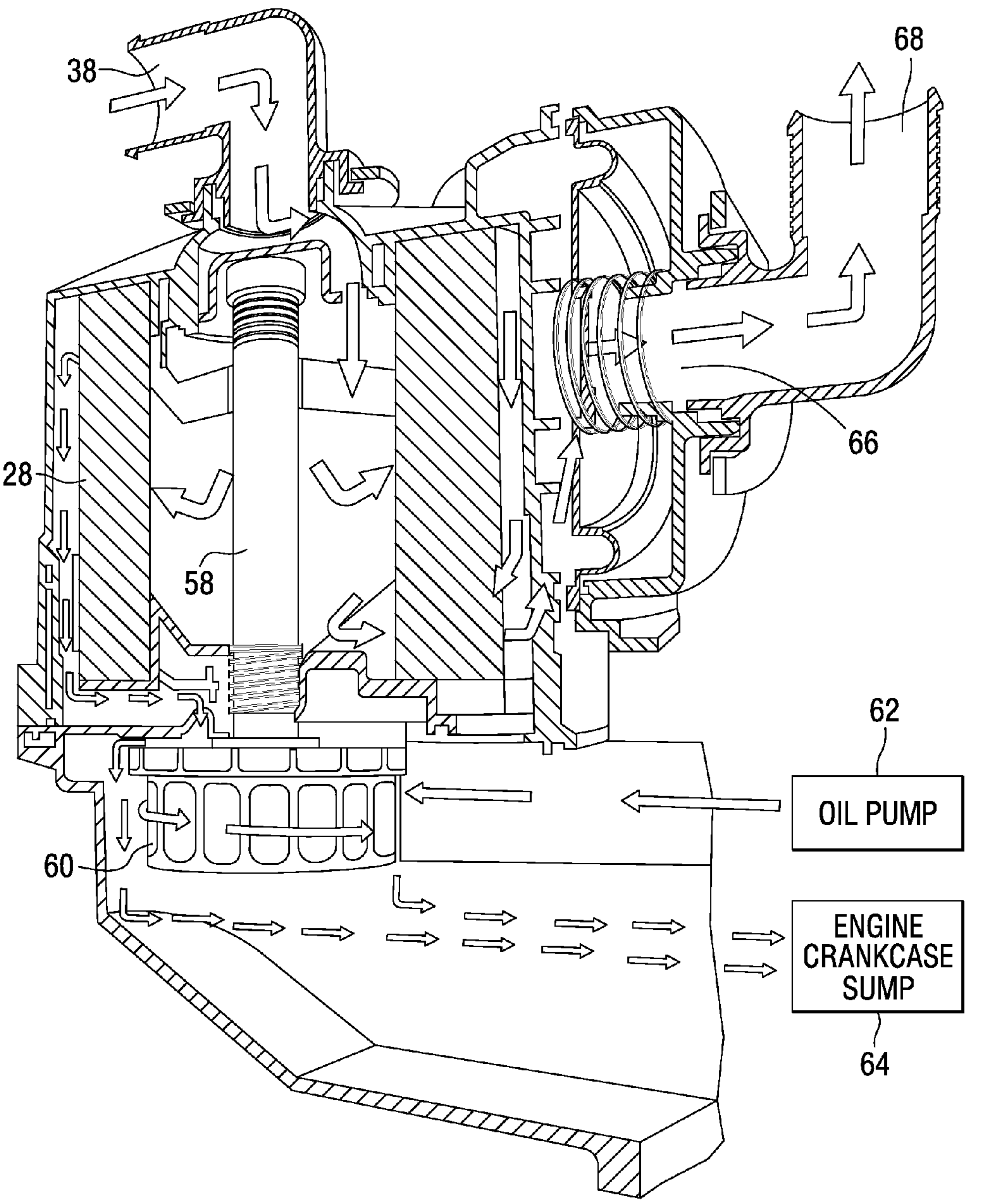
Figure 3:
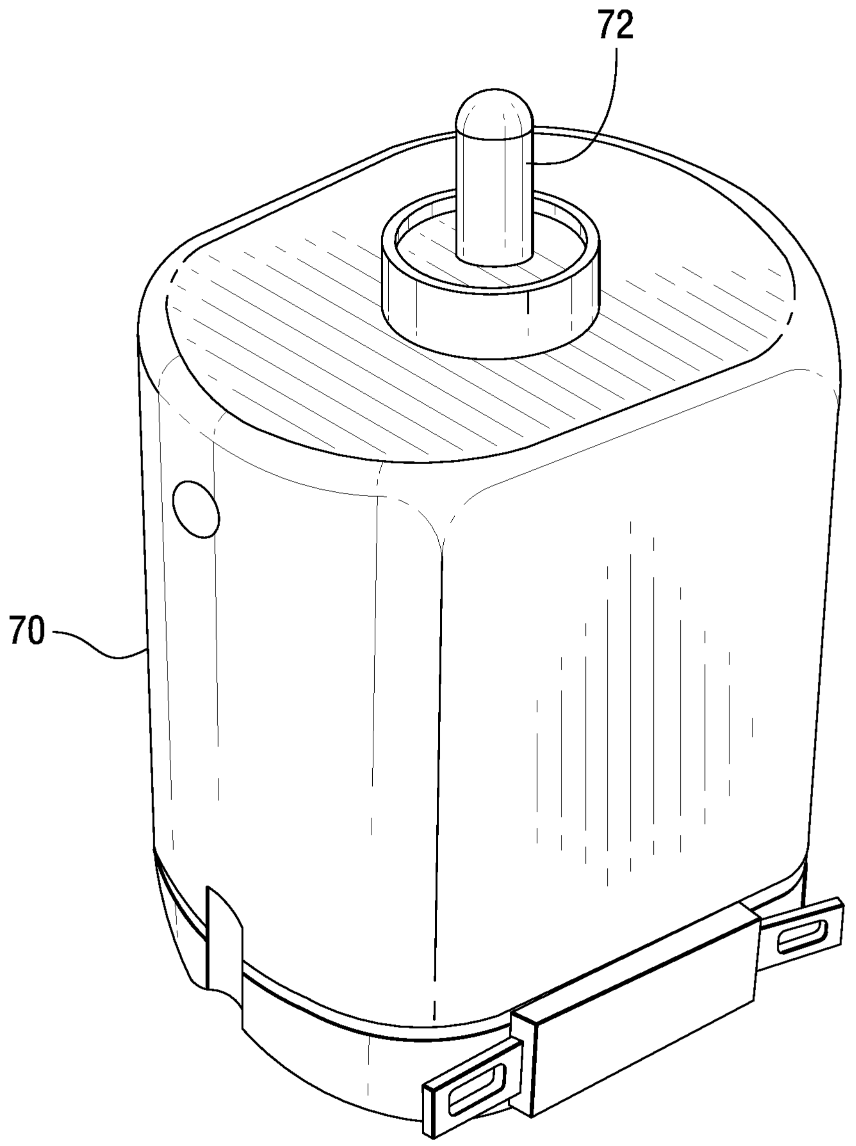
Figure 4:
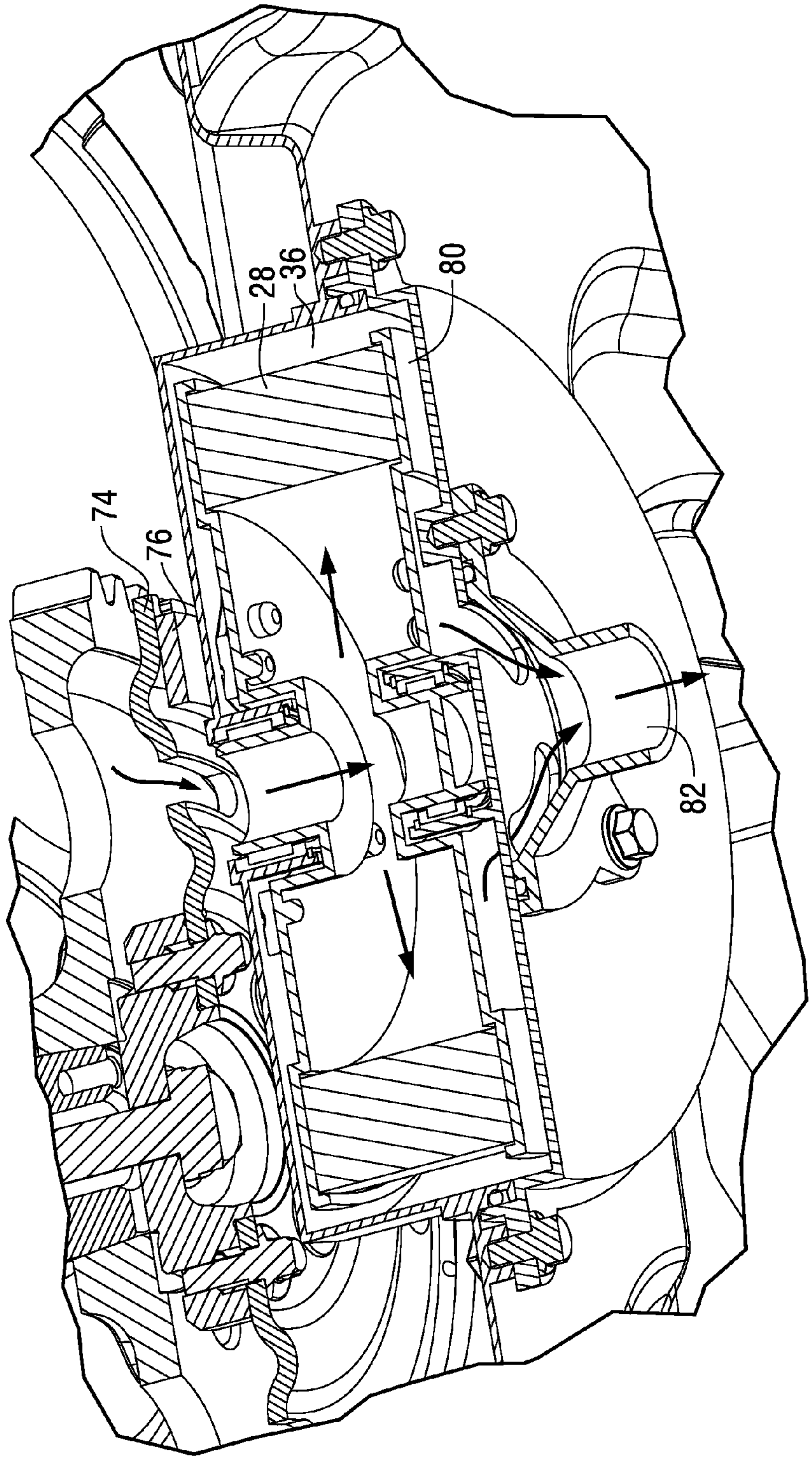
Figure 5:
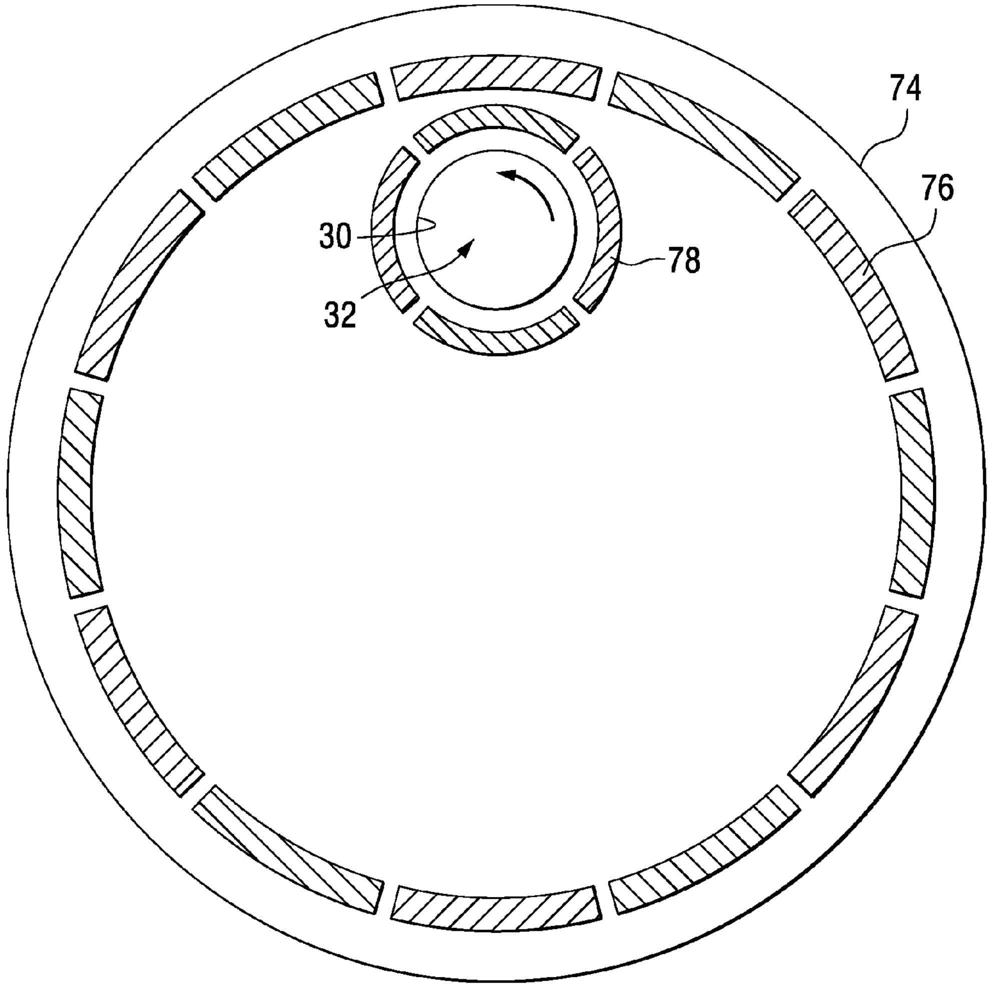

In one embodiment, coalescing filter element 28 is driven to rotate by a mechanical coupling to a component of the engine, e.g. axially extending shaft 58 connected to a gear or drive pulley of the engine. In another embodiment, coalescing filter element 28 is driven to rotate by a fluid motor, e.g. a pelton or turbine drive wheel 60, FIG. 2, driven by pumped pressurized oil from the engine oil pump 62 and returning same to engine crankcase sump 64. FIG. 2 uses like reference numerals from FIG. 1 where appropriate to facilitate understanding. Separated cleaned air is supplied through pressure responsive valve 66 to outlet 68 which is an alternate outlet to that shown at 42 in FIG. 1. In another embodiment, coalescing filter element 28 is driven to rotate by an electric motor 70, FIG. 3, having a drive output rotary shaft 72 coupled to shaft 58. In another embodiment, coalescing filter element 28 is driven to rotate by magnetic coupling to a component of the engine, FIGS. 4, 5. An engine driven rotating gear 74 has a plurality of magnets such as 76 spaced around the periphery thereof and magnetically coupling to a plurality of magnets 78 spaced around inner periphery 30 of the coalescing filter element such that as gear or driving wheel 74 rotates, magnets 76 move past, FIG. 5, and magnetically couple with magnets 78, to in turn rotate the coalescing filter element as a driven member. In FIG. 4, separated cleaned air flows from exterior zone 36 through channel 80 to outlet 82, which is an alternate cleaned air outlet to that shown at 42 in FIG. 1. The arrangement in FIG. 5 provides a gearing-up effect to rotate the coalescing filter assembly at a greater rotational speed (higher angular velocity) than driving gear or wheel 74, e.g. where it is desired to provide a higher rotational speed of the coalescing filter element.

Pressure drop across coalescing filter element 28 decreases with increasing rotational speed of the coalescing filter element. Oil saturation of coalescing filter element 28 decreases with increasing rotational speed of the coalescing filter element. Oil drains from outer periphery 34, and the amount of oil drained increases with increasing rotational speed of coalescing filter element 28. Oil particle settling velocity in coalescing filter element 28 acts in the same direction as the direction of air flow through the coalescing filter element. The noted same direction enhances capture and coalescence of oil particles by the coalescing filter element.

The system provides a method for separating air from oil in internal combustion engine crankcase ventilation blowby gas by introducing a G force in coalescing filter element 28 to cause increased gravitational settling in the coalescing filter element, to improve particle capture and coalescence of submicron oil particles by the coalescing filter element. The method includes providing an annular coalescing filter element 28, rotating the coalescing filter element, and providing inside-out flow through the rotating coalescing filter element.

The system provides a method for reducing crankcase pressure in an internal combustion engine crankcase generating blowby gas. The method includes providing a crankcase ventilation system including a coalescing filter element 28 separating air from oil in the blowby gas, providing the coalescing filter element as an annular element having a hollow interior 32, supplying the blowby gas to the hollow interior, and rotating the coalescing filter element to pump blowby gas out of crankcase 24 and into hollow interior 32 due to centrifugal force forcing the blowby gas to flow radially outwardly as shown at arrows 46 through coalescing filter element 28, which pumping effects reduced pressure in crankcase 24.

One type of internal combustion engine crankcase ventilation system provides open crankcase ventilation (OCV), wherein the cleaned air separated from the blowby gas is discharged to the atmosphere. Another type of internal combustion crankcase ventilation system involves closed crankcase ventilation (CCV), wherein the cleaned air separated from the blowby gas is returned to the engine, e.g. is returned to the combustion air intake system to be mixed with the incoming combustion air supplied to the engine.

Figure 6:
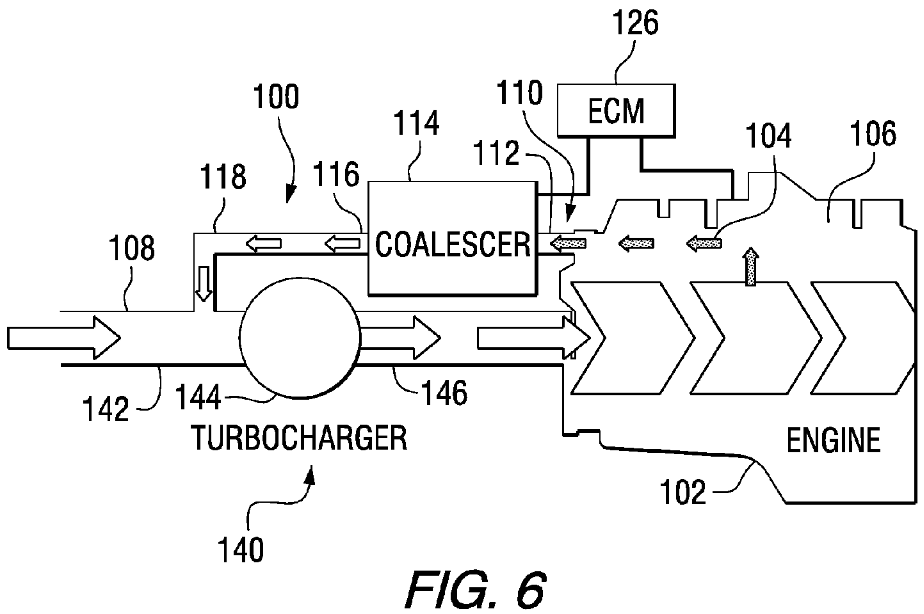
Figure 7:
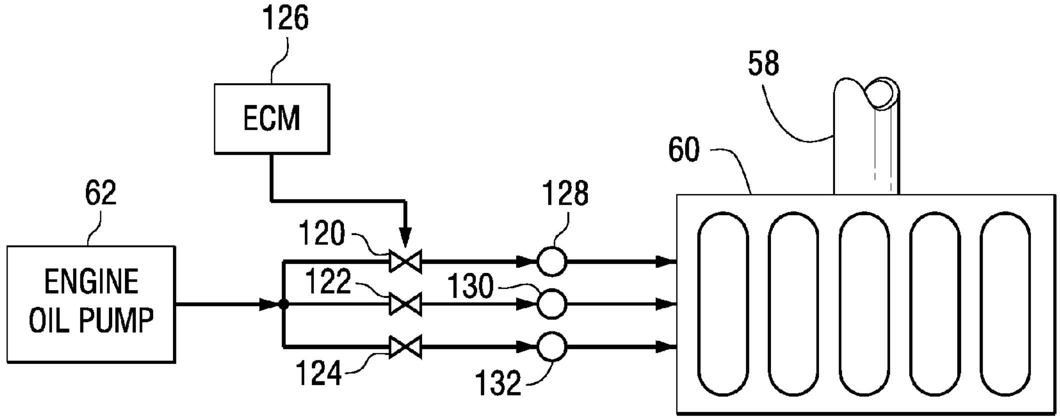

FIG. 6 shows a closed crankcase ventilation (CCV) system 100 for an internal combustion engine 102 generating blowby gas 104 in a crankcase 106. The system includes an air intake duct 108 supplying combustion air to the engine, and a return duct 110 having a first segment 112 supplying the blowby gas from the crankcase to air-oil coalescer 114 to clean the blowby gas by coalescing oil therefrom and outputting cleaned air at output 116, which may be outlet 42 of FIG. 1, 68 of FIG. 2, 82 of FIG. 4. Return duct 110 includes a second segment 118 supplying the cleaned air from coalescer 114 to air intake duct 108 to join the combustion air being supplied to the engine. Coalescer 114 is variably controlled according to a given condition of the engine, to be described.

Coalescer 114 has a variable efficiency variably controlled according to a given condition of the engine. In one embodiment, coalescer 114 is a rotating coalescer, as above, and the speed of rotation of the coalescer is varied according to the given condition of the engine. In one embodiment, the given condition is engine speed. In one embodiment, the coalescer is driven to rotate by an electric motor, e.g. 70, FIG. 3. In one embodiment, the electric motor is a variable speed electric motor to vary the speed of rotation of the coalescer. In another embodiment, the coalescer is hydraulically driven to rotate, e.g. FIG. 2. In one embodiment, the speed of rotation of the coalescer is hydraulically varied. In this embodiment, the engine oil pump 62, FIGS. 2, 7, supplies pressurized oil through a plurality of parallel shut-off valves such as 120, 122, 124 which are controlled between closed and open or partially open states by the electronic control module (ECM) 126 of the engine, for flow through respective parallel orifices or nozzles 128, 130, 132 to controllably increase or decrease the amount of pressurized oil supplied against pelton or turbine wheel 60, to in turn controllably vary the speed of rotation of shaft 58 and coalescing filter element 28.

In one embodiment, a turbocharger system 140, FIG. 6, is provided for the internal combustion 102 generating blowby gas 104 in crankcase 106. The system includes the noted air intake duct 108 having a first segment 142 supplying combustion air to a turbocharger 144, and a second segment 146 supplying turbocharged combustion air from turbocharger 144 to engine 102. Return duct 110 has the noted first segment 112 supplying the blowby gas 104 from crankcase 106 to air-oil coalescer 114 to clean the blowby gas by coalescing oil therefrom and outputting cleaned air at 116. The return duct has the noted second segment 118 supplying cleaned air from coalescer 114 to first segment 142 of air intake duct 108 to join combustion air supplied to turbocharger 144. Coalescer 114 is variably controlled according to a given condition of at least one of turbocharger 144 and engine 102. In one embodiment, the given condition is a condition of the turbocharger. In a further embodiment, the coalescer is a rotating coalescer, as above, and the speed of rotation of the coalescer is varied according to turbocharger efficiency. In a further embodiment, the speed of rotation of the coalescer is varied according to turbocharger boost pressure. In a further embodiment, the speed of rotation of the coalescer is varied according to turbocharger boost ratio, which is the ratio of pressure at the turbocharger outlet versus pressure at the turbocharger inlet. In a further embodiment, the coalescer is driven to rotate by an electric motor, e.g. 70, FIG. 3. In a further embodiment, the electric motor is a variable speed electric motor to vary the speed of rotation of the coalescer. In another embodiment, the coalescer is hydraulically driven to rotate, FIG. 2. In a further embodiment, the speed of rotation of the coalescer is hydraulically varied, FIG. 7.

The system provides a method for improving turbocharger efficiency in a turbocharger system 140 for an internal combustion engine 102 generating blowby gas 104 in a crankcase 106, the system having an air intake duct 108 having a first segment 142 supplying combustion air to a turbocharger 144, and a second segment 146 supplying turbocharged combustion air from the turbocharger 144 to the engine 102, and having a return duct 110 having a first segment 112 supplying the blowby gas 104 to air-oil coalescer 114 to clean the blowby gas by coalescing oil therefrom and outputting cleaned air at 116, the return duct having a second segment 118 supplying the cleaned air from the coalescer 114 to the first segment 142 of the air intake duct to join combustion air supplied to turbocharger 144. The method includes variably controlling coalescer 114 according to a given condition of at least one of turbocharger 144 and engine 102. One embodiment variably controls coalescer 114 according to a given condition of turbocharger 144. A further embodiment provides the coalescer as a rotating coalescer, as above, and varies the speed of rotation of the coalescer according to turbocharger efficiency. A further method varies the speed of rotation of coalescer 114 according to turbocharger boost pressure. A further embodiment varies the speed of rotation of coalescer 114 according to turbocharger boost ratio, which is the ratio of pressure at the turbocharger outlet versus pressure at the turbocharger inlet.

Figure 8:
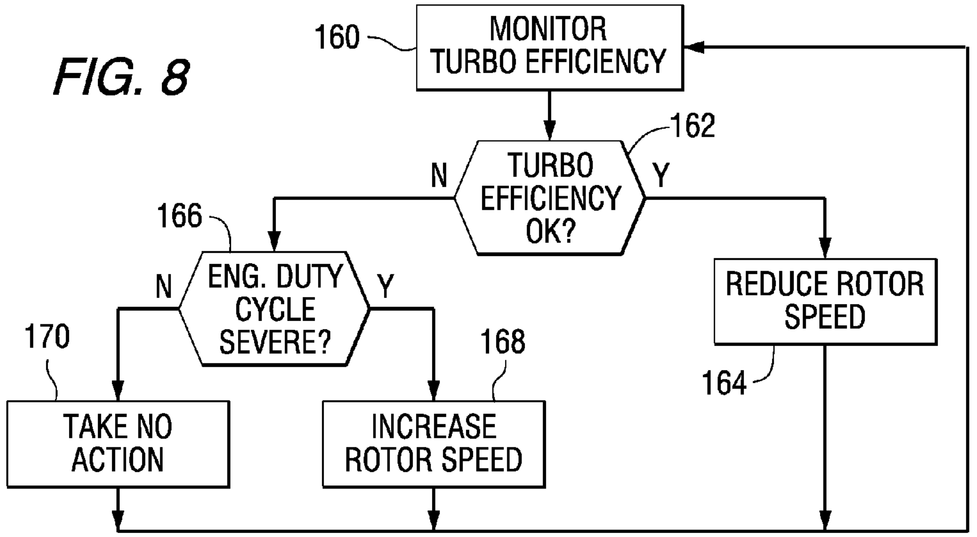

FIG. 8 shows a control scheme for CCV implementation. At step 160, turbocharger efficiency is monitored, and if the turbo efficiency is ok as determined at step 162, then rotor speed of the coalescing filter element is reduced at step 164. If the turbocharger efficiency is not ok, then engine duty cycle is checked at step 166, and if the engine duty cycle is not severe then rotor speed is increased at step 168, and if engine duty cycle is not severe then no action is taken as shown at step 170.

Figure 9:
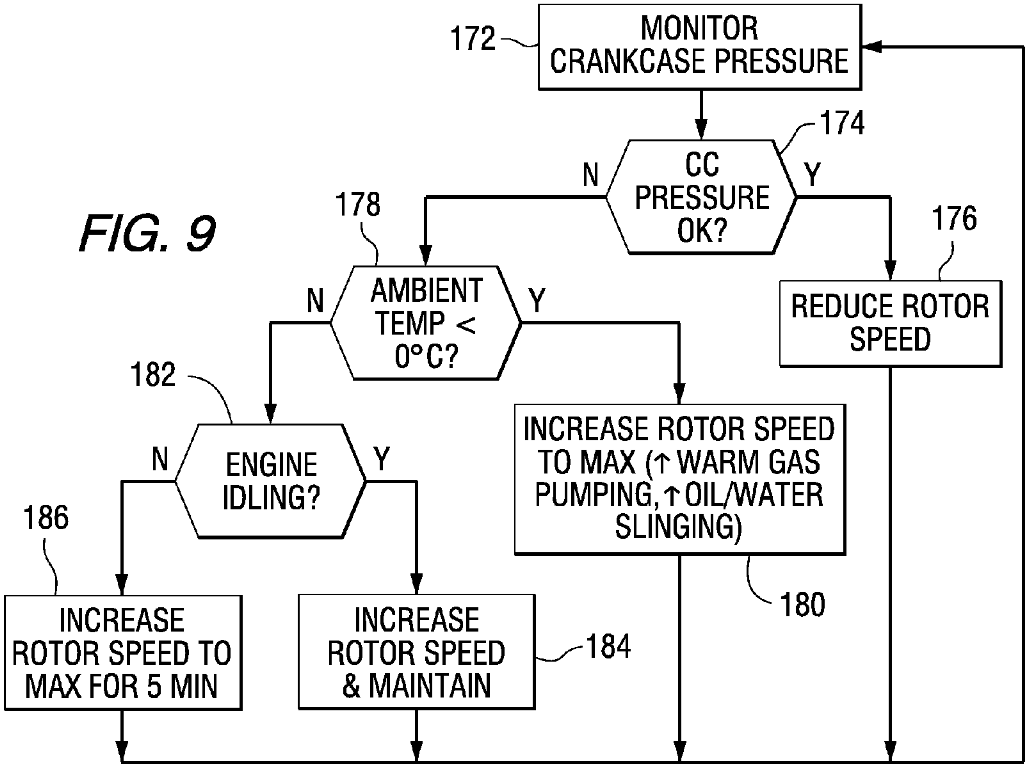

FIG. 9 shows a control scheme for OCV implementation. Crankcase pressure is monitored at step 172, and if it is ok as determined at step 174 then rotor speed is reduced at step 176, and if not ok then ambient temperature is checked at step 178 and if less than 0° C., then at step 180 rotor speed is increased to a maximum to increase warm gas pumping and increase oil-water slinging. If ambient temperature is not less than 0° C., then engine idling is checked at step 182, and if the engine is idling then at step 184 rotor speed is increased and maintained, and if the engine is not idling, then at step 186 rotor speed is increased to a maximum for five minutes.

Figure 10:
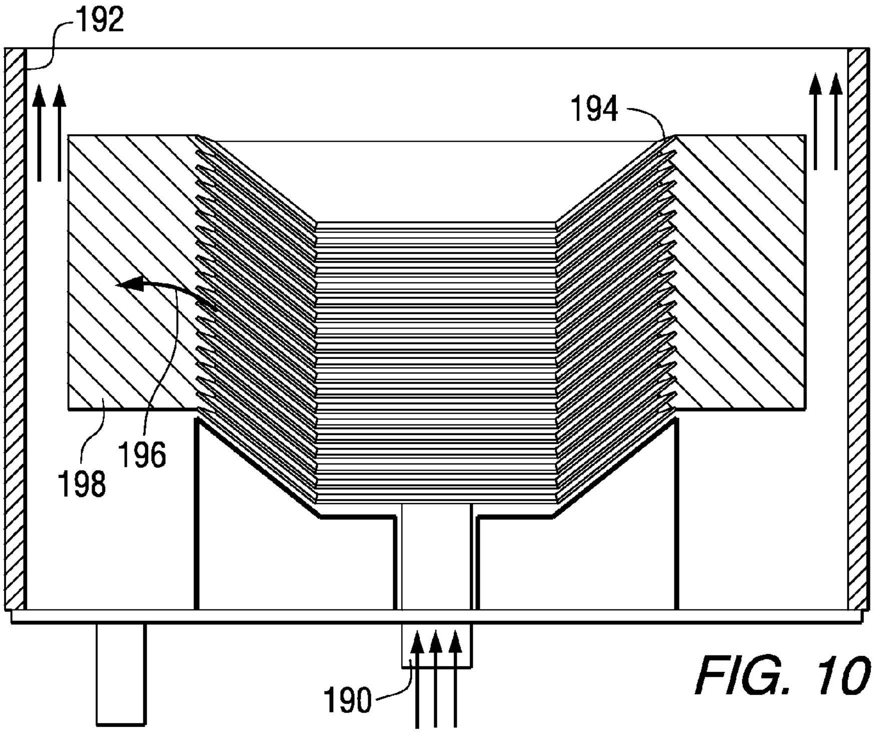
Figure 11:
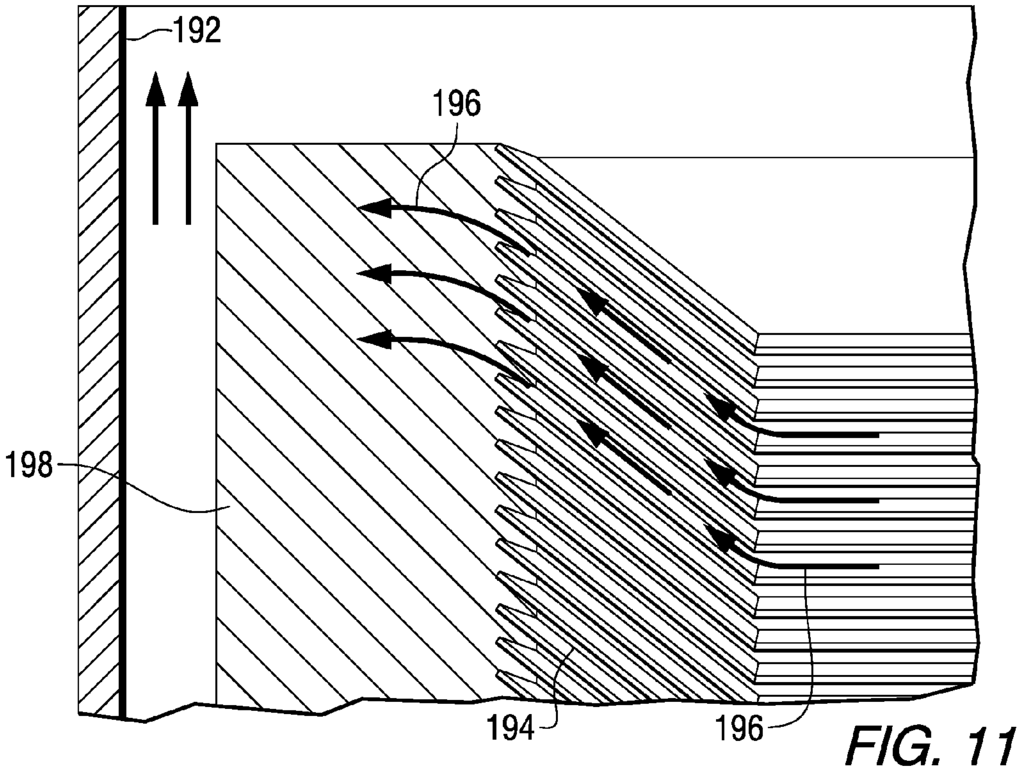
Figure 12:
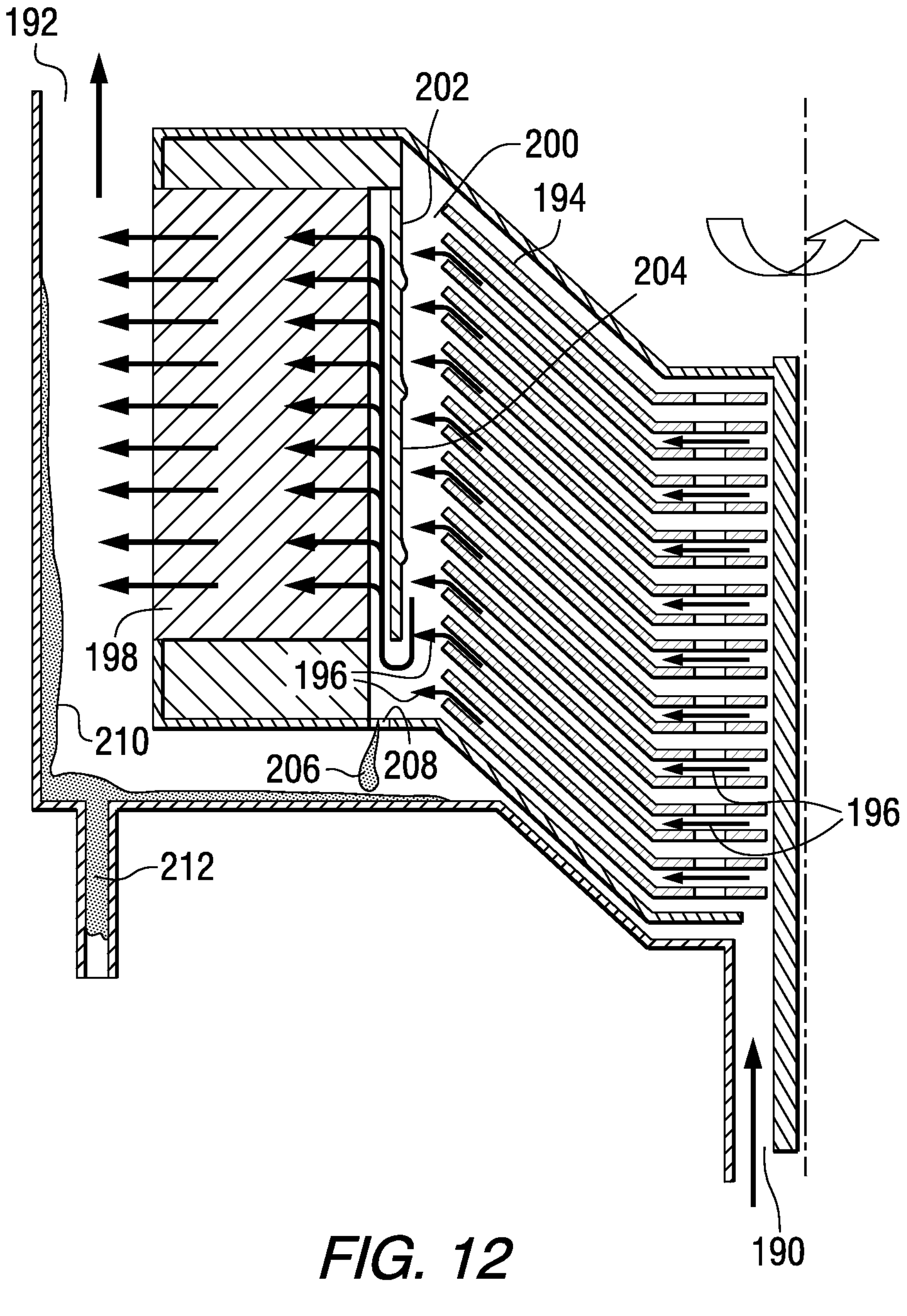

The flow path through the coalescing filter assembly is from upstream to downstream, e.g. in FIG. 1 from inlet port 38 to outlet port 42, e.g. in FIG. 2 from inlet port 38 to outlet port 68, e.g. in FIG. 10 from inlet port 190 to outlet port 192. There is further provided in FIG. 10 in combination a rotary cone stack separator 194 located in the flow path and separating air from oil in the blowby gas. Cone stack separators are known in the prior art. The direction of blowby gas flow through the rotating cone stack separator is inside-out, as shown at arrows 196, FIGS. 10-12. Rotating cone stack separator 194 is upstream of rotating coalescer filter element 198. Rotating cone stack separator 194 is in hollow interior 200 of rotating coalescer filter element 198. In FIG. 12, an annular shroud 202 is provided in hollow interior 200 and is located radially between rotating cone stack separator 194 and rotating coalescer filter element 198 such that shroud 202 is downstream of rotating cone stack separator 194 and upstream of rotating coalescer filter element 198 and such that shroud 202 provides a collection and drain surface 204 along which separated oil drains after separation by the rotating cone stack separator, which oil drains as shown at droplet 206 through drain hole 208, which oil then joins the oil separated by coalescer 198 as shown at 210 and drains through main drain 212.

Figure 13:
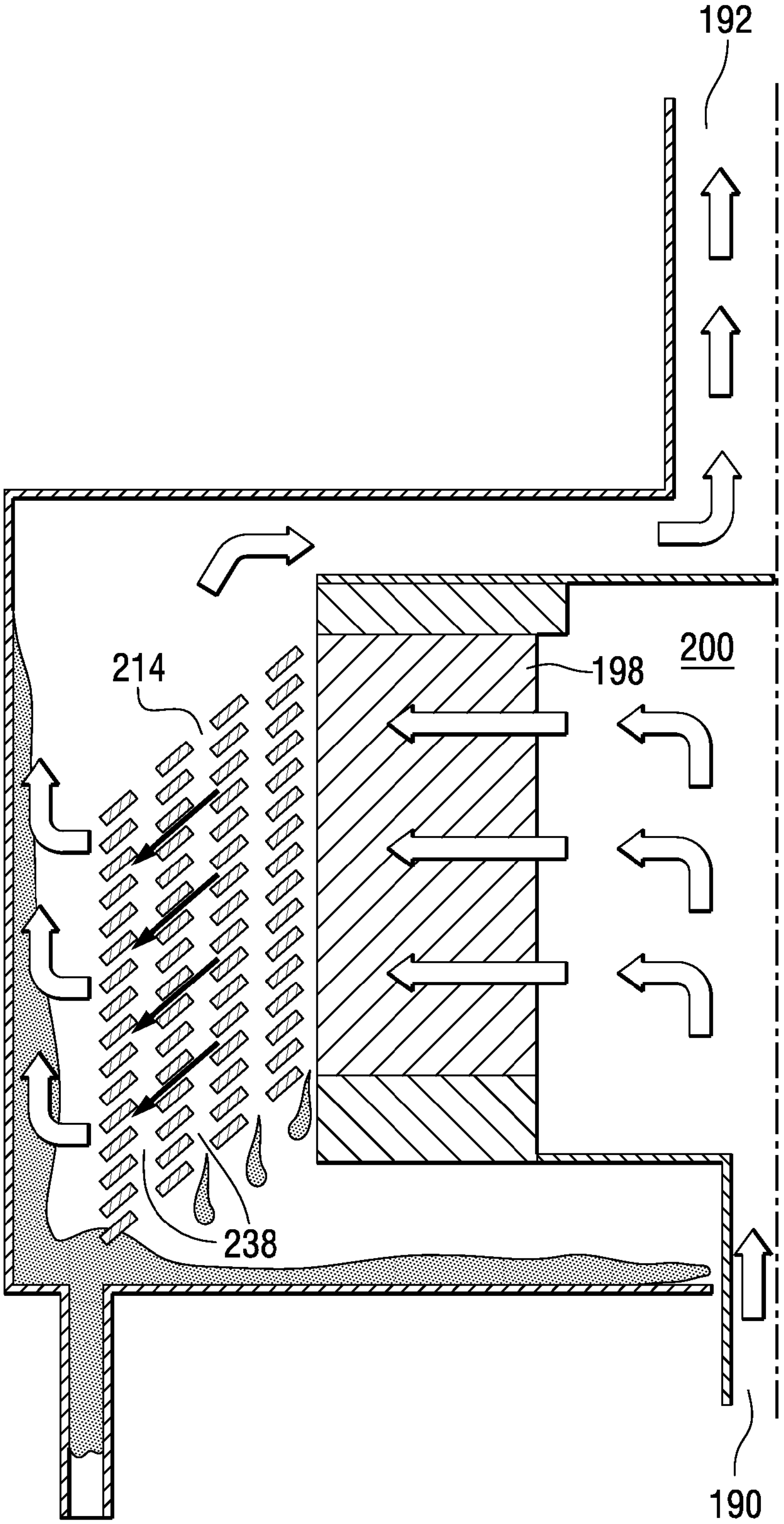

FIG. 13 shows a further embodiment and uses like reference numerals from above where appropriate to facilitate understanding. Rotating cone stack separator 214 is downstream of rotating coalescer filter element 198. The direction of flow through rotating cone stack separator 214 is inside-out. Rotating cone stack separator 214 is located radially outwardly of and circumscribes rotating coalescer filter element 198.

Figure 14:
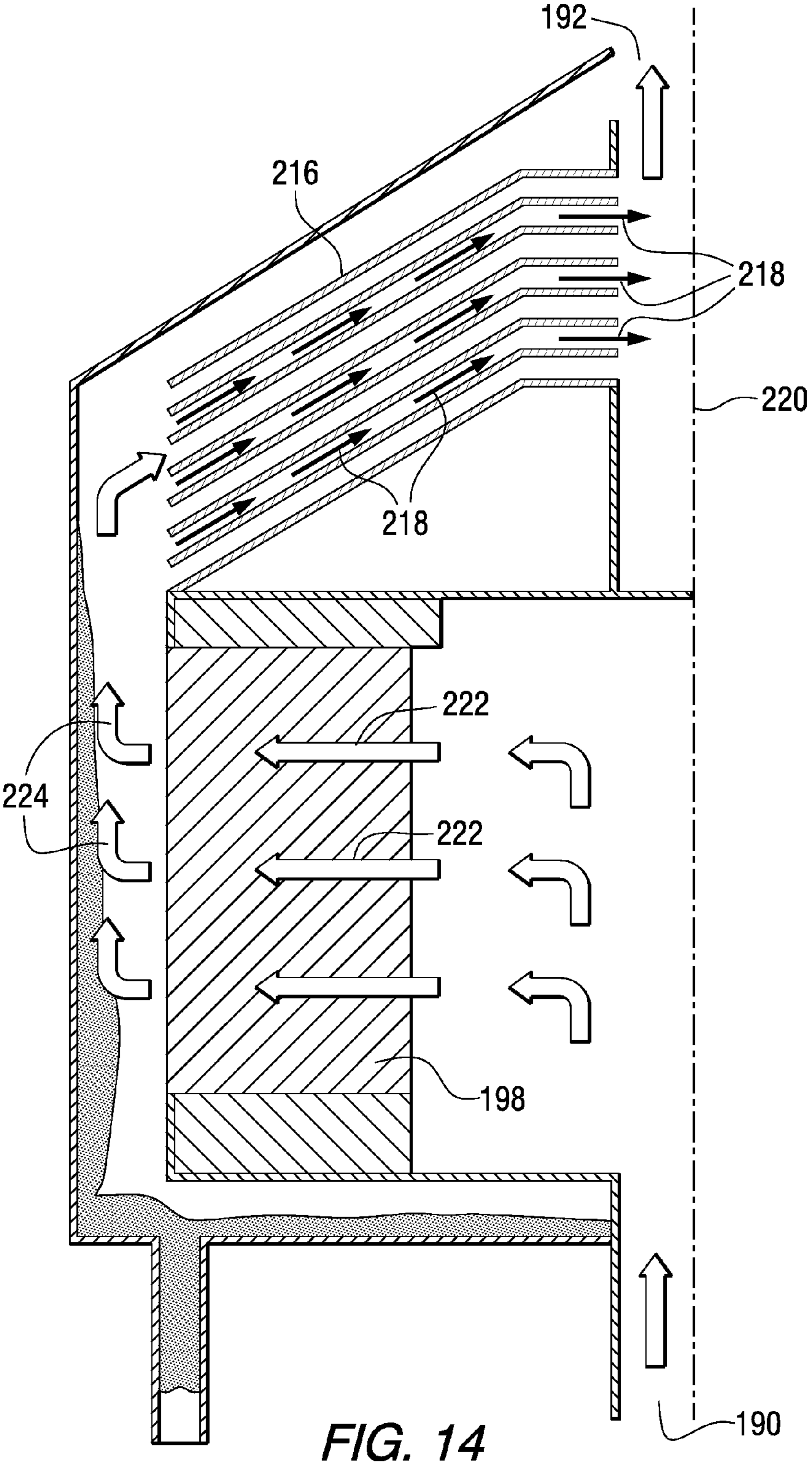

FIG. 14 shows another embodiment and uses like reference numerals from above where appropriate to facilitate understanding. Rotating cone stack separator 216 is downstream of rotating coalescer filter element 198. The direction of flow through rotating cone stack separator 216 is outside-in, as shown at arrows 218. Rotating coalescer filter element 198 and rotating cone stack separator 216 rotate about a common axis 220 and are axially adjacent each other. Blowby gas flows radially outwardly through rotating coalescer filter element 198 as shown at arrows 222 then axially as shown at arrows 224 to rotating cone stack separator 216 then radially inwardly as shown at arrows 218 through rotating cone stack separator 216.

Figure 15:
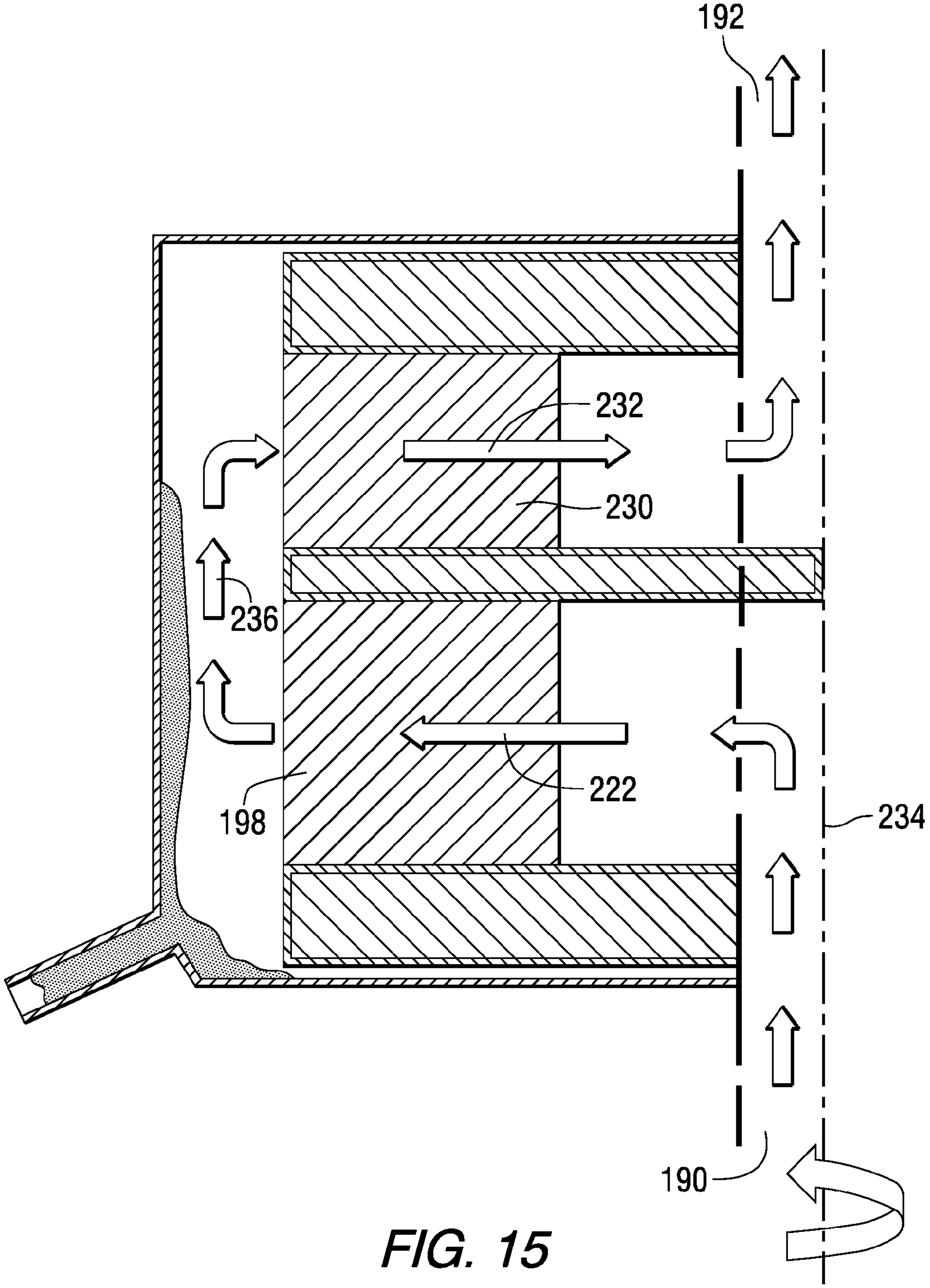

FIG. 15 shows another embodiment and uses like reference numerals from above where appropriate to facilitate understanding. A second annular rotating coalescer filter element 230 is provided in the noted flow path from inlet 190 to outlet 192 and separates air from oil in the blowby gas. The direction of flow through second rotating coalescer filter element 230 is outside-in as shown at arrow 232. Second rotating coalescer filter element 230 is downstream of first rotating coalescer element 198. First and second rotating coalescer filter elements 198 and 230 rotate about a common axis 234 and are axially adjacent each other. Blowby gas flows radially outwardly as shown at arrow 222 through first rotating coalescer filter element 198 then axially as shown at arrow 236 to second rotating coalescer filter element 230 then radially inwardly as shown at arrow 232 through second rotating coalescer filter element 230.

In various embodiments, the rotating cone stack separator may be perforated with a plurality of drain holes, e.g. 238, FIG. 13, allowing drainage therethrough of separated oil.

Figure 16:
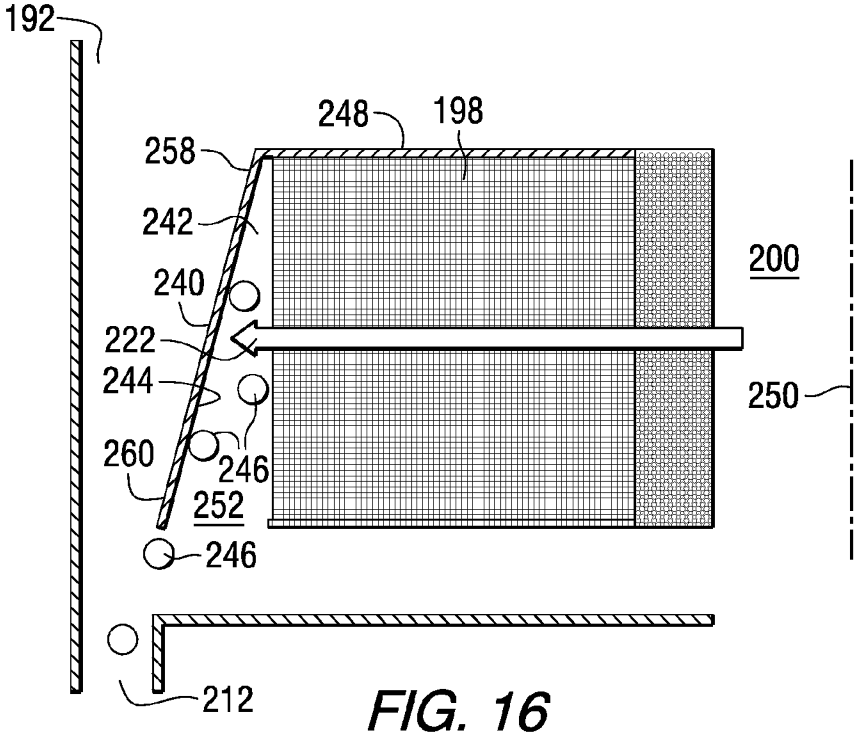
Figure 17:
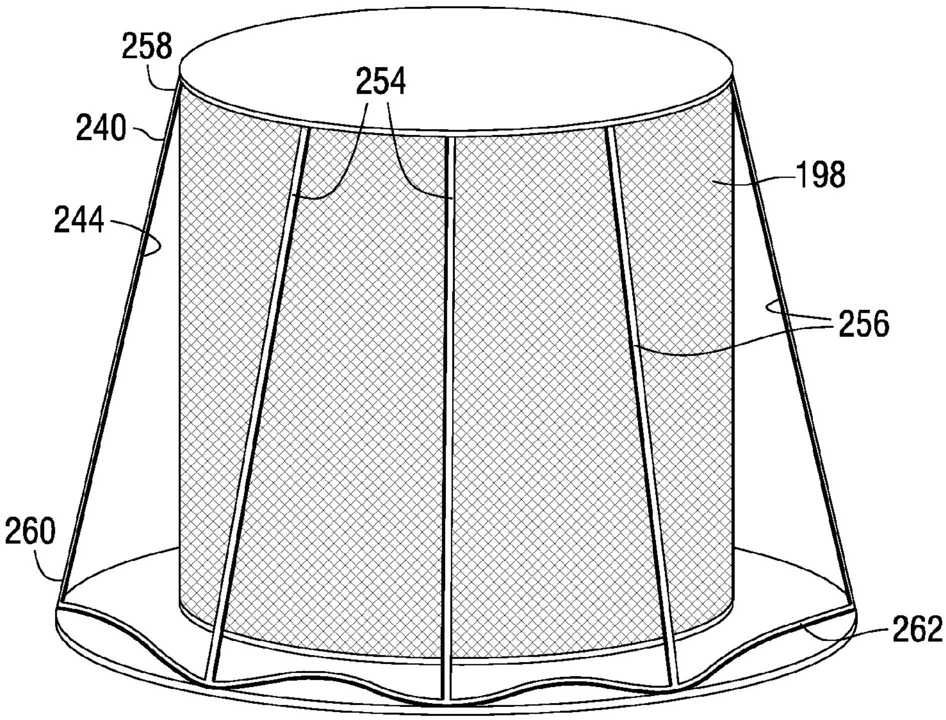

FIG. 16 shows another embodiment and uses like reference numerals from above where appropriate to facilitate understanding. An annular shroud 240 is provided along the exterior 242 of rotating coalescer filter element 198 and radially outwardly thereof and downstream thereof such that shroud 240 provides a collection and drain surface 244 along which separated oil drains as shown at droplets 246 after coalescence by rotating coalescer filter element 198. Shroud 240 is a rotating shroud and may be part of the filter frame or end cap 248. Shroud 240 circumscribes rotating coalescer filter element 198 and rotates about a common axis 250 therewith. Shroud 240 is conical and tapers along a conical taper relative to the noted axis. Shroud 240 has an inner surface at 244 radially facing rotating coalescer filter element 198 and spaced therefrom by a radial gap 252 which increases as the shroud extends axially downwardly and along the noted conical taper. Inner surface 244 may have ribs such as 254, FIG. 17, circumferentially spaced therearound and extending axially and along the noted conical taper and facing rotating coalescer filter element 198 and providing channeled drain paths such as 256 therealong guiding and draining separated oil flow therealong. Inner surface 244 extends axially downwardly along the noted conical taper from a first upper axial end 258 to a second lower axial end 260. Second axial end 260 is radially spaced from rotating coalescer filter element 198 by a radial gap greater than the radial spacing of first axial end 258 from rotating coalescer filter element 198. In a further embodiment, second axial end 260 has a scalloped lower edge 262, also focusing and guiding oil drainage.

Figure 18:
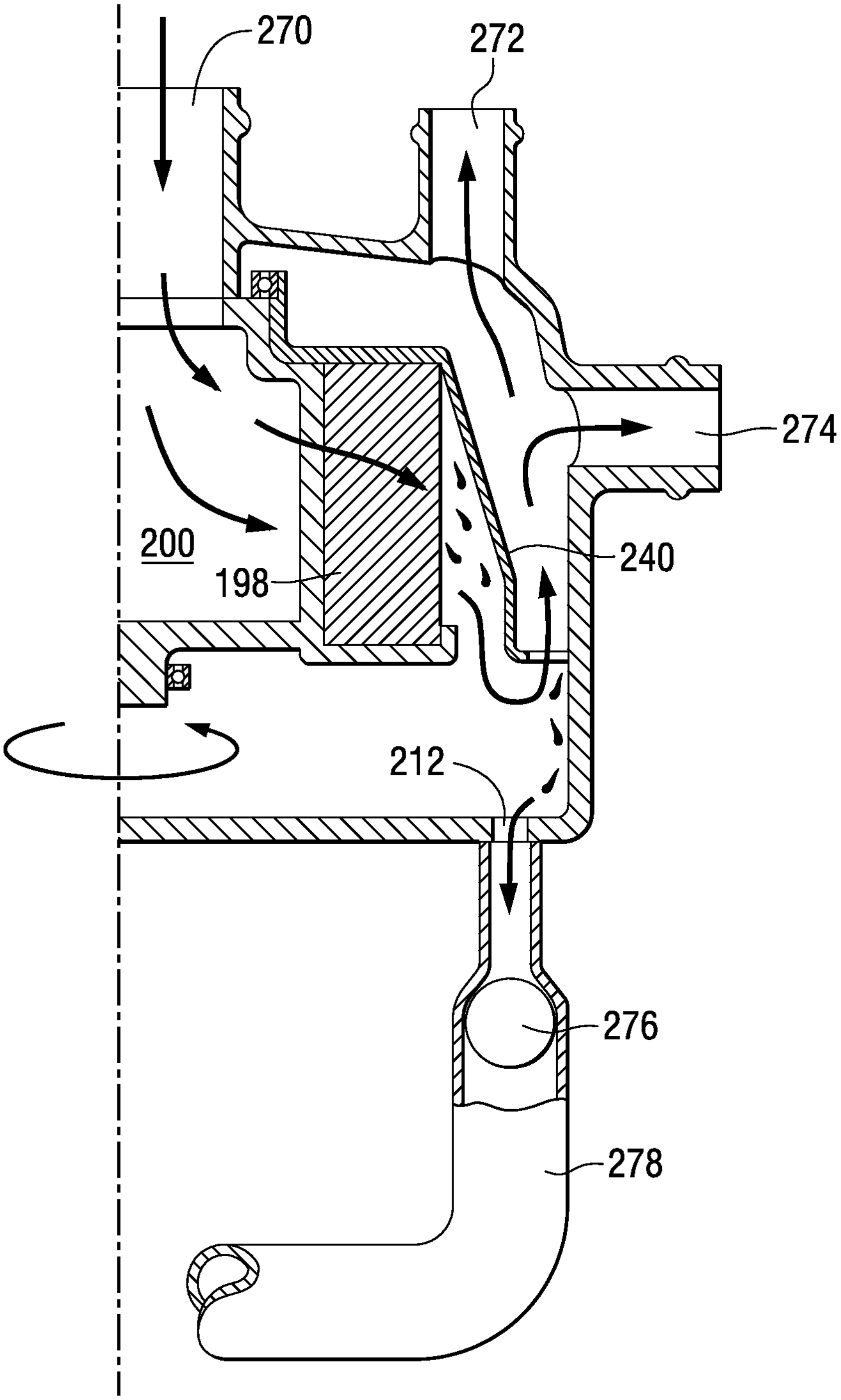

FIG. 18 shows a further embodiment and uses like reference numerals from above where appropriate to facilitate understanding. In lieu of lower inlet 190, FIGS. 13-15, an upper inlet port 270 is provided, and a pair of possible or alternate outlet ports are shown at 272 and 274. Oil drainage through drain 212 may be provided through a one-way check valve such as 276 to drain hose 278, for return to the engine crankcase, as above.

Figure 19:
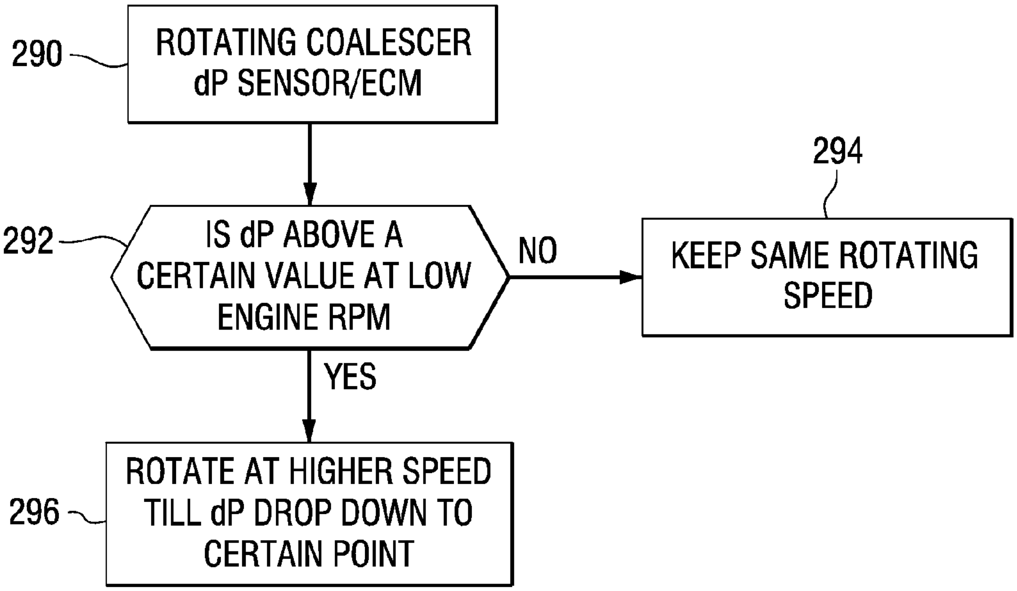

As above noted, the coalescer can be variably controlled according to a given condition, which may be a given condition of at least one of the engine, the turbocharger, and the coalescer. In one embodiment, the noted given condition is a given condition of the engine, as above noted. In another embodiment, the given condition is a given condition of the turbocharger, as above noted. In another embodiment, the given condition is a given condition of the coalescer. In a version of this embodiment, the noted given condition is pressure drop across the coalescer. In a version of this embodiment, the coalescer is a rotating coalescer, as above, and is driven at higher rotational speed when pressure drop across the coalescer is above a predetermined threshold, to prevent accumulation of oil on the coalescer, e.g. along the inner periphery thereof in the noted hollow interior, and to lower the noted pressure drop. FIG. 19 shows a control scheme wherein the pressure drop, dP, across the rotating coalescer is sensed, and monitored by the ECM (engine control module), at step 290, and then it is determined at step 292 whether dP is above a certain value at low engine RPM, and if not, then rotational speed of the coalescer is kept the same at step 294, and if dP is above a certain value then the coalescer is rotated at a higher speed at step 296 until dP drops down to a certain point. The noted given condition is pressure drop across the coalescer, and the noted predetermined threshold is a predetermined pressure drop threshold.

Figure 20:
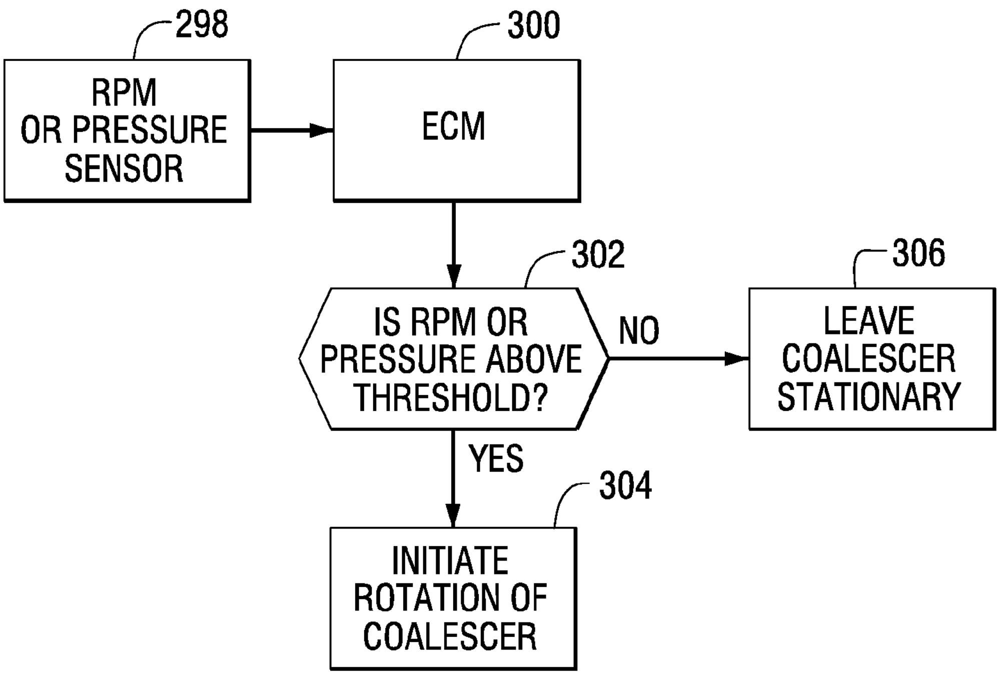
Figure 21:
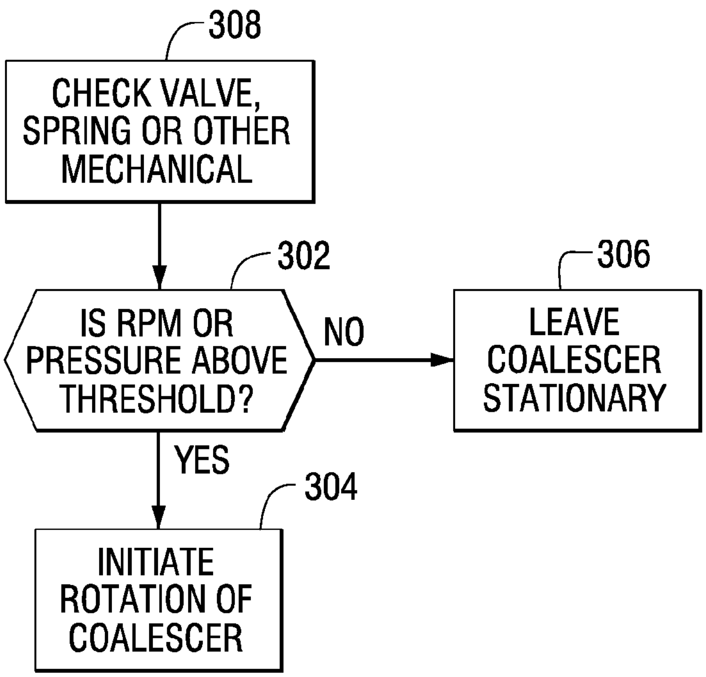

In a further embodiment, the coalescer is an intermittently rotating coalescer having two modes of operation, and is in a first stationary mode when a given condition is below a predetermined threshold, and is in a second rotating mode when the given condition is above the predetermined threshold, with hysteresis if desired. The first stationary mode provides energy efficiency and reduction of parasitic energy loss. The second rotating mode provides enhanced separation efficiency removing oil from the air in the blowby gas. In one embodiment, the given condition is engine speed, and the predetermined threshold is a predetermined engine speed threshold. In another embodiment, the given condition is pressure drop across the coalescer, and the predetermined threshold is a predetermined pressure drop threshold. In another embodiment, the given condition is turbocharger efficiency, and the predetermined threshold is a predetermined turbocharger efficiency threshold. In a further version, the given condition is turbocharger boost pressure, and the predetermined threshold is a predetermined turbocharger boost pressure threshold. In a further version, the given condition is turbocharger boost ratio, and the predetermined threshold is a predetermined turbocharger boost ratio threshold, where, as above noted, turbocharger boost ratio is the ratio of pressure at the turbocharger outlet vs. pressure at the turbocharger inlet. FIG. 20 shows a control scheme for an electrical version wherein engine RPM or coalescer pressure drop is sensed at step 298 and monitored by the ECM at step 300 and then at step 302 if the RPM or pressure is above a threshold then rotation of the coalescer is initiated at step 304, and if the RPM or pressure is not above the threshold then the coalescer is left in the stationary mode at step 306. FIG. 21 shows a mechanical version and uses like reference numerals from above where appropriate to facilitate understanding. A check valve, spring or other mechanical component at step 308 senses RPM or pressure and the decision process is carried out at steps 302, 304, 306 as above.

The noted method for improving turbocharger efficiency includes variably controlling the coalescer according to a given condition of at least one of the turbocharger, the engine, and the coalescer. One embodiment variably controls the coalescer according to a given condition of the turbocharger. In one version, the coalescer is provided as a rotating coalescer, and the method includes varying the speed of rotation of the coalescer according to turbocharger efficiency, and in another embodiment according to turbocharger boost pressure, and in another embodiment according to turbocharger boost ratio, as above noted. A further embodiment variably controls the coalescer according to a given condition of the engine, and in a further embodiment according to engine speed. In a further version, the coalescer is provided as a rotating coalescer, and the method involves varying the speed of rotation of the coalescer according to engine speed. A further embodiment variably controls the coalescer according to a given condition of the coalescer, and in a further version according to pressure drop across the coalescer. In a further version, the coalescer is provided as a rotating coalescer, and the method involves varying the speed of rotation of the coalescer according to pressure drop across the coalescer. A further embodiment involves intermittently rotating the coalescer to have two modes of operation including a first stationary mode and a second rotating mode, as above.

Present Application

FIG. 22 shows a gas-liquid rotating coalescer 402 separating liquid from a gas-liquid mixture 404. A coalescing filter assembly 406 includes a housing 408 closed by a lid 410 and having an inlet 412 receiving gas-liquid mixture 404, a gas outlet 414 discharging separated gas as shown at dashed line arrow 416, and a drain outlet 418 discharging separated liquid as shown at solid line arrow 420. An annular rotating coalescing filter element 422 is provided in the housing, and a rotary drive member is provided, e.g. a rotary drive shaft 424, or other rotary drive member, including as described above. A first set of one or more detent surfaces 426, FIGS. 22-24, are provided on the rotary drive member which may include a drive plate 428. A second set of one or more detent surfaces 430 is provided on the coalescing filter element, e.g. on lower endcap 432 in the orientation shown. Other orientations are possible, e.g. a horizontal element axis. The second set of one or more detent surfaces 430 engagingly interacts with the first set of one or more detent surfaces 426 in interlocking mating keyed relation to effect rotation of the coalescing filter element by the rotary drive member. In one aspect, designated operation of the coalescer including designated rotation of coalescing filter element 422 requires that the coalescing filter element include the noted second set of one or more detent surfaces 430, including engaged interaction with the first set of one or more detent surfaces 426 in interlocking mating keyed relation. This in turn ensures that only an authorized replacement coalescing filter element is used during maintenance servicing, and that a nonauthorized aftermarket replacement coalescing filter element missing the noted second set of one or more detent services will not effect the noted designated operation, e.g. a nonauthorized element will not rotate, or will not rotate smoothly at the proper speed of rotation, or will wobble, clatter, or vibrate undesirably, and so on. In various embodiments, the noted designated operation includes optimal and sub-optimal performance.

Coalescing filter element 422 rotates about an axis 434 and extends axially between first and second axial ends 436 and 438 and includes respective first and second axial endcaps 440 and 432. Second axial endcap 432 has an axial endface 442 facing axially away from first axial end 436. Second axial endcap 432 has a peripheral outer sideface 444 facing radially outwardly away from axis 434. The noted second set of one or more detent surfaces is on at least one of endface 442 and outer sideface 444. In the embodiment of FIGS. 22-24, the noted second set of one or more detent surfaces 430 is on endface 442. Further in this embodiment, one of the noted first and second sets of detent surfaces, e.g. second set 430, is provided by one or more raised axially protruding ridges 446, including protrusions or the like, e.g. extending axially downwardly in FIGS. 22-23, and the other of the first and second sets of detent surfaces, e.g. first set 426, is provided by one or more axially recessed slots 448, including depressions or the like, e.g. recessed downwardly in FIG. 23, into the page in FIG. 24. Each slot 448 receives a respective ridge 446 inserted axially thereinto in nested relation providing the noted engaged interaction in interlocking mating keyed relation. In further embodiments, the first and second sets of one or more detent surfaces are provided by protrusions that mate. In the embodiment shown, the plurality of ridges and slots extend laterally as spokes radially outwardly from a hub 450 or other central region at axis 434. FIGS. 25-29 show further embodiments for the noted axially inserted nesting. One of the first and second sets of one or more detent surfaces, e.g. second set 430, may be provided by a raised axially protruding protrusion member 452, FIG. 25, having an outer periphery having a keyed shape, e.g. a six pointed star in FIG. 25, a five pointed star protrusion member 454 in FIG. 26, a multi-pointed star or serrated shape protrusion member 456 in FIG. 27, a four pointed member such as rectangular shaped protrusion member 458 in FIG. 28, a three pointed triangular shaped protrusion member 460 in FIG. 29, a hexagon (not shown), etc. The other of the noted first and second sets of one or more detent surfaces, e.g. first set 426, may be provided by an axially recessed pocket 462, e.g. in drive plate 428 of rotary drive member 424, which axially recessed pocket has an inner periphery having a reception shape complemental to the keyed shape of the respective protrusion member 452, 454, 456, 458, 460, etc., and receiving the protrusion member inserted axially into the respective pocket such as 462 in keyed relation. In various embodiments, the noted keyed shape is characterized by a perimeter such as shown at 462 having a nonuniform radius from axis 434.

In a further embodiment, the first set of one or more detent surfaces 426 may be provided by a first set of gear teeth 472, FIG. 30, on a rotary driven drive plate 474, which set of gear teeth 472 may face axially toward second endcap 432. The noted second set of one or more detent surfaces 430 may be provided by a second set of gear teeth 476, FIGS. 31-33, on endface 442 and facing axially away from the second endcap and engaging the first set of gear teeth 472 in driven relation. In another embodiment, the noted second set of one or more detent surfaces 430 are provided on outer sideface 444, and the set of gear teeth 472, FIG. 30, face radially inwardly toward second endcap 432. In this embodiment, the noted second set of one or more detent surfaces is provided by a second set of gear teeth on outer sideface 444 and facing radially outwardly away from second endcap 432 and engaging the noted first set of gear teeth in driven relation.

In a further embodiment, FIGS. 34-37, the rotary drive member is provided by a cam or pulley 482 driven by a belt or gear or otherwise as above, e.g. FIGS. 1-5, and provided in housing 484 closed by a lid 486 and containing rotating coalescing filter element 488. Driven member 482 may have the noted first set of one or more detent surfaces, e.g. provided by axially recessed slots 490, FIG. 35, and lower endcap 492 of the coalescing filter element may have the noted second set of one or more detent surfaces 494, e.g. as provided by the noted axially protruding ridges for insertion into slots 490. The upper endcap 496 of the rotating coalescing filter element 488 may have a thrust button 498, FIG. 37, for axial insertion upwardly into pocket 500 of cover 486 for centered alignment and to provide thrust to create engagement pressure.

In a further embodiment, FIG. 38, coalescing filter element 502 rotates about axis 434 and extends axially along the axis between first and second axial ends having respective first and second axial endcaps 504 and 506. The second endcap 506 has an axial endface 508 facing axially away from the noted first axial end. Second axial endcap 506 has a peripheral outer sideface 510 facing radially outwardly away from axis 434. Second axial endcap 506 has an inner sideface 512 facing radially inwardly towards axis 434. Inner sideface 512 is spaced radially outwardly of axis 434 and radially inwardly of outer sideface 510. The noted second set of one or more detent surfaces 430 is provided on at least one of inner sideface 512, endface 508, and outer sideface 510. In one embodiment, the noted second set of one or more detent surfaces is provided on inner sideface 512 at 514. In one embodiment, the noted first set of one or more detent surfaces 426 is provided on a rotary drive member 516 as shown at 518 and engages the second set of one or more detent surfaces 514 on inner sideface 512 in bayonet relation, which may be a Tee hook and slot relation as shown at 520 in FIG. 39, or may be a single hook and side slot arrangement as shown at 522 in FIG. 40, or other known bayonet relation. Inner sideface 512 may form an axially recessed pocket 524 in second endcap 506, wherein rotary drive member 516 extends axially into pocket 524.

In further embodiments, FIGS. 41-53, one of the noted first and second sets of one or more detent surfaces is a pliable member such as 532 on the coalescing filter element endcap 432 and complementally pliably conforming to the other of the first and second sets of one or more detent surfaces, e.g. FIGS. 42-44, 46, 48, 50. The noted first and second sets of one or more detent surfaces engage each other in the noted interlocking mating keyed relation in a first engagement direction of rotation, FIGS. 51-53, and permit slippage in a second opposite direction of rotation. In other embodiments, slippage may occur in either direction or not at all. In further embodiments, a pliable member is additionally included on the rotary drive member plate 428.

In a further embodiment, FIGS. 54-56, coalescing filter element 552 rotates about axis 434 and extends axially along the axis between first and second axial ends 554 and 556, FIG. 56, having respective first and second axial endcaps 558 and 560. Coalescing filter element 552 has an axially extending hollow interior 562. A torsional-resistance alignment coupler 564 extends axially between first and second endcaps 558 and 560 and maintains alignment thereof and prevents torsional twisting and wobble of coalescer filter element 552 therebetween, which may be desirable if the element is provided by coalescing filter media with little or no structural support therealong.

The noted first and second sets of one or more detent surfaces are provided in FIGS. 54-56 by a rotary drive shaft 564 having an outer keyed profile, e.g. a hexagonal shape at 566, and endcap 560 having a complemental inner periphery 568 of hexagonal shape. A third set of one or more detent surfaces 570 is provided on rotary drive member 564, for example another hexagonal outer profile, which may or may not be a continuation of the profile from 566. A fourth set of one or more detent surfaces 572 is provided on the coalescing filter element, for example at first endcap 558 at inner peripheral hexagonal surface 572. The rotary drive member is provided by rotary drive shaft 564 extending through second axial endcap 560 and axially through hollow interior 562 and engaging first axial endcap 558. The second set of one or more detent surfaces 568 is on second endcap 560. The fourth set of one or more detent surfaces 572 is on first endcap 558. The first and third sets of one or more detent surfaces 566 and 570 are on rotary drive shaft 564 at axially spaced locations therealong, e.g. as shown at 566 and 570. The first and second sets of one or more detent surfaces 566 and 568 engage each other in interlocking mating keyed relation as rotary drive shaft 564 extends axially through second endcap 560. Third and fourth sets of one or more detent surfaces 570 and 572 engage each other in interlocking mating keyed relation as rotary drive shaft 564 engages first endcap 558. The axial extension of rotary drive shaft 564 through hollow interior 562 between the first and third sets of one or more detent surfaces 566 and 570 provides the noted respective engagement of second and fourth sets of one or more detent surfaces 568 and 572 on respective endcaps 560 and 558 and provides an alignment coupler extending axially between first and second endcaps 558 and 560 and maintaining alignment thereof and preventing torsional twisting of the coalescer filter element therebetween. In one embodiment, each of the noted first, second, third and fourth sets of one or more detent surfaces 566, 568, 570, 572 has a polygonal shape providing the noted engaged interaction in the noted interlocking mating keyed relation, and in one embodiment such polygonal shape is hexagonal. Other detent surface engagement in interlocking mating keyed relation may be provided. The noted detent surface may go through the element or may just form a pocket. For example, in one embodiment, lower endcap 560 is pierced, while the upper endcap 558 has a pocket. In other embodiments, the upper endcap is pierced. In further embodiments, the drive shaft only engages the lower endcap 560, which lower endcap may be pierced for passage of the drive shaft therethrough, or such lower endcap may have a pocket for receiving the drive shaft without pass-through. In various embodiments, the pocket and/or protrusions face the element, and in others face away from the element.

First endcap 558 has a first set of a plurality of vanes 574 extending axially downwardly in FIGS. 54, 56 into hollow interior 562 toward second endcap 560 and also extending radially outwardly from a first central hub 576 having an inner periphery 572 providing the noted fourth set of one or more detent surfaces. Second endcap 560 has a second set of a plurality of vanes 578 extending axially upwardly in FIGS. 54, 56 into hollow interior 562 toward first endcap 558 and also extending radially outwardly from a second central hub 580 having an inner periphery 568 providing the noted second set of one or more detent surfaces. The first and second sets of vanes 574 and 578 extend axially towards each other and in one embodiment engage each other in hollow interior 562. In one embodiment, the vanes of one of the noted sets, e.g. set 574, have axially extending apertures 580 therein. In this embodiment, the vanes of the other of the sets, e.g. set 578, have axially extending rods 582 which extend axially into apertures 580. In various embodiments, vanes 574, 578 and/or rods 582, apertures 580 are eliminated.

In various embodiments, the noted annular coalescer element is an inside-out flow coalescer element. The annular coalescer element has an annular shape selected from the group consisting of circular, oval, oblong, racetrack, pear, triangular, rectangular, and other closed-loop shapes.

In one embodiment, the disclosure provides a replacement coalescing filter element as above described, wherein designated operation of the coalescer including rotation of the coalescing filter element requires the noted second set of one or more detent surfaces, which in one embodiment may be at either axial end and/or may additionally include the noted fourth set of one or more detent surfaces, including the noted engaged interaction with the noted first set of one or more detent surfaces, which in one embodiment may additionally include the noted third set of one or more detent surfaces, in interlocking mating keyed relation, whereby a nonauthorized replacement coalescing filter element missing the noted second set of one or more detent surfaces, or the noted alternatives, will not effect the noted designated operation. This may be desirable to prevent the use of a nonauthorized aftermarket replacement coalescing filter element during maintenance servicing.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A gas-liquid rotating coalescer separating liquid from a gas-liquid mixture, comprising:

a coalescing filter assembly comprising a housing having an inlet receiving said gas-liquid mixture, a gas outlet discharging separated gas, and a drain outlet discharging separated liquid, an annular rotating inside-out flow coalescing filter element in said housing, the filter element having an endcap, a drive shaft, a rotary drive member coupled to the drive shaft, said rotary drive member positioned between said drive shaft and said endcap when said annular rotating coalescing filter element is received in said housing, a first set of one or more detent surfaces on said rotary drive member, and a second set of one or more detent surfaces on said endcap of said coalescing filter element, said second set of one or more detent surfaces engagingly interacting with said first set of one or more detent surfaces in interlocking mating keyed relation to effect rotation of said coalescing filter element by said rotary drive member.

2. The gas-liquid rotating coalescer according to claim 1 wherein one of said first and second sets of one or more detent surfaces comprises protruding ridges, and the other of said first and second sets of one or more detent surfaces comprises recessed slots.

3. The gas-liquid rotating coalescer according to claim 2 wherein said protruding ridges include protrusions, and said recessed slots include depressions.

4. The gas-liquid rotating coalescer according to claim 1 wherein said first and second sets of one or more detent surfaces comprise protrusions that mate.

5. The gas-liquid rotating coalescer according to claim 1 wherein designated operation of said coalescer including designated rotation of said coalescing filter element requires said coalescing filter element to include said second set of one or more detent surfaces, including said engaged interaction with said first set of one or more detent surfaces in said interlocking mating keyed relation.

6. The gas-liquid rotating coalescer according to claim 5 wherein said designated operation includes optimal and suboptimal performance.

7. The gas-liquid rotating coalescer according to claim 1 wherein said coalescing filter element rotates about an axis and extends axially along said axis between first and second axial ends having respective first and second axial endcaps, said second axial endcap having an axial endface facing axially away from said first axial end, said second axial endcap having a peripheral outer sideface facing radially outwardly away from said axis, and wherein said second set of one or more detent surfaces is on at least one of said endface and said outer sideface.

8. The gas-liquid rotating coalescer according to claim 7 wherein: said second set of one or more detent surfaces is on said endface; one of said first and second sets of detent surfaces comprises one or more raised axially protruding ridges; the other of said first and second sets of detent surfaces comprises one or more axially recessed slots, each slot receiving a respective said ridge inserted axially thereinto in nested relation providing said engaged interaction in said interlocking mating keyed relation.

9. The gas-liquid rotating coalescer according to claim 8 comprising a plurality of said ridges extending laterally as spokes radially outwardly away from a central region at said axis.

10. The gas-liquid rotating coalescer according to claim 7 wherein: said second set of one or more detent surfaces is on said endface; one of said first and second sets of one or more detent surfaces comprises a raised axially protruding protrusion member having an outer periphery having a keyed shape; the other of said first and second sets of one or more detent surfaces comprises an axially recessed pocket having an inner periphery having a reception shape complemental to said keyed shape of said protrusion member and receiving said protrusion member inserted axially into said pocket in keyed relation.

11. The gas-liquid rotating coalescer according to claim 10 wherein said keyed shape is characterized by a perimeter having a nonuniform radius from said axis.

12. The gas-liquid rotating coalescer according to claim 7 wherein: said first set of one or more detent surfaces comprises a first set of gear teeth facing axially toward said second endcap; said second set of one or more detent surfaces comprises a second set of gear teeth on said endface and facing axially away from said second endcap and engaging said first set of gear teeth in driven relation.

13. The gas-liquid rotating coalescer according to claim 7 wherein said second set of one or more detent surfaces is on said outer sideface.

14. The gas-liquid rotating coalescer according to claim 13 wherein: said first set of one or more detent surfaces comprises a first set of gear teeth facing radially inwardly toward said second endcap; said second set of one or more detent surfaces comprises a second set of gear teeth on said outer sideface and facing radially outwardly away from said second endcap and engaging said first set of gear teeth in driven relation.

15. The gas-liquid rotating coalescer according to claim 1 wherein said coalescing filter element rotates about an axis and extends axially along said axis between first and second axial ends having respective first and second axial endcaps, said second axial endcap having an axial endface facing axially away from said first axial end, said second axial endcap having a peripheral outer sideface facing radially outwardly away from said axis, and an inner sideface facing radially inwardly towards said axis, said inner sideface being spaced radially outwardly of said axis and radially inwardly of said outer sideface, and wherein said second set of one or more detent surfaces is on at least one of said inner sideface, said endface, and said outer sideface.

16. The gas-liquid rotating coalescer according to claim 15 wherein said second set of one or more detent surfaces is on said inner sideface.

17. The gas-liquid rotating coalescer according to claim 16 wherein said first set of one or more detent surfaces on said rotary drive member engages said second set of one or more detent surfaces on said inner sideface in bayonet relation.

18. The gas-liquid rotating coalescer according to claim 15 wherein said inner sideface forms an axially recessed pocket in said second endcap, and said rotary drive member extends axially into said pocket.

19. The gas-liquid rotating coalescer according to claim 1 wherein one of said first and second sets of one or more detent surfaces comprises a pliable member on the respective one of said rotary drive member and said coalescing filter element and complementally pliably conforming to the other of said first and second sets of one or more detent surfaces.

20. The gas-liquid rotating coalescer according to claim 1 wherein said first and second sets of one or more detent surfaces engage each other in said interlocking mating keyed relation in a first engagement direction of rotation, and permit slippage in a second opposite direction of rotation.

21. The gas-liquid rotating coalescer according to claim 1 wherein said coalescing filter element rotates about an axis and extends axially along said axis between first and second axial ends having respective first and second axial endcaps, said coalescing filter element having an axially extending hollow interior, and comprising a third set of one or more detent surfaces on said rotary drive member, and a fourth set of one or more detent surfaces on said coalescing filter element, said rotary drive member comprising a rotary drive shaft extending axially through said second axial endcap and axially through said hollow interior and engaging said first axial endcap, said second set of one or more detent surfaces being on said second endcap, said fourth set of one or more detent surfaces being on said first endcap, said first and third sets of one or more detent surfaces being on said rotary drive shaft at axially spaced locations therealong, said first and second sets of one or more detent surfaces engaging each other in interlocking mating keyed relation as said rotary drive shaft extends through said second endcap, said third and fourth sets of one or more detent surfaces engaging each other in interlocking mating keyed relation as said rotary drive shaft engages said first endcap.

22. The gas-liquid rotating coalescer according to claim 21 wherein the axial extension of said rotary drive shaft through said hollow interior between said first and third sets of one or more detent surfaces respectively engaging said second and fourth sets of one or more detent surfaces on respective said endcaps provides an alignment coupler extending axially between said first and second endcaps and maintaining alignment thereof and preventing torsional twisting of said coalescer filter element therebetween.

23. The gas-liquid rotating coalescer according to claim 21 wherein said each of said first, second, third and fourth sets of one or more detent surfaces has a polygonal shape providing said engaged interaction in said interlocking mating keyed relation.

24. The gas-liquid rotating coalescer according to claim 23 wherein said polygonal shape is hexagonal.

25. The gas-liquid rotating coalescer according to claim 23 wherein at least one of said first and second endcaps has a plurality of vanes extending axially into said hollow interior and extending radially outwardly from a central hub having an inner periphery providing one of said second and fourth sets of one or more detent surfaces engaging said rotary drive shaft.

26. The gas-liquid rotary coalescer according to claim 23 wherein: said first endcap has a first set of a plurality of vanes extending axially into said hollow interior toward said second endcap and extending radially outwardly from a first central hub having an inner periphery providing said fourth set of one or more detent surfaces; said second endcap has a second set of a plurality of vanes extending axially into said hollow interior toward said first endcap and extending radially outwardly from a second central hub having an inner periphery providing said second set of one or more detent surfaces.

27. The gas-liquid rotating coalescer according to claim 26 wherein said first and second sets of vanes extend axially towards each other and engage each other in said hollow interior.

28. The gas-liquid rotating coalescer according to claim 26 wherein the vanes of one of said sets have axially extending apertures therein, and the vanes of the other of said sets have axially extending rods which extend axially into said apertures.

29. The gas-liquid rotating coalescer according to claim 1 wherein said coalescing filter element rotates about an axis and extends axially along said axis between first and second axial ends having respective first and second axial endcaps, said coalescing filter element having an axially extending hollow interior, a torsional-resistance alignment coupler extending axially between said first and second endcaps and maintaining alignment thereof and preventing torsional twisting of said coalescer filter element therebetween.

30. The gas-liquid rotating coalescer according to claim 1 wherein said annular coalescer element has an annular shape selected from the group consisting of circular, oval, oblong, racetrack, pear, triangular, rectangular, and other closed-loop shapes.

31. A coalescing filter element for a gas-liquid rotating coalescer separating liquid from a gas-liquid mixture in a coalescing filter assembly having a housing, the housing having an inlet receiving said gas-liquid mixture, a gas outlet discharging separated gas, and a drain outlet discharging separated liquid, said assembly including a rotary drive member coupled to a drive shaft, the rotary drive member having a first set of one or more detent surfaces, said coalescing filter element comprising:

an annular rotating inside-out flow coalescing filter element having an endcap such that said rotary drive member is positioned between said endcap and said drive shaft when said annular rotating coalescing filter element is positioned within said housing, a second set of one or more detent surfaces on the endcap, the second set of one or more detent surfaces engagingly interacting with said first set of one or more detent surfaces in interlocking mating keyed relation to effect rotation of said coalescing filter element by said rotary drive member, wherein designated operation of said gas-liquid rotating coalescer, including designated rotation of said coalescing filter element, requires said second set of one or more detent surfaces, including said engaged interaction with said first set of one or more detent surfaces in said interlocking mating keyed relation, whereby a coalescing filter element missing said second set of one or more detent surfaces will not affect effect said designated operation.

32. The coalescing filter element according to claim 31 wherein one of said first and second sets of one or more detent surfaces comprises protruding ridges, and the other of said first and second sets of one or more detent surfaces comprises recessed slots.

33. The coalescing filter element according to claim 32 wherein said protruding ridges include protrusions, and said recessed slots include depressions.

34. The coalescing filter element according to claim 31 wherein said first and second sets of one or more detent surfaces comprise protrusions that mate.

35. The coalescing filter element according to claim 31 wherein said coalescing filter element rotates about an axis and extends axially along said axis between first and second axial ends having respective first and second axial endcaps, said second axial endcap having an axial endface facing axially away from said first axial end, said second axial endcap having a peripheral outer sideface facing radially outwardly away from said axis, and wherein said second set of one or more detent surfaces is on at least one of said endface and said outer sideface.

36. The coalescing filter element according to claim 35 wherein: said second set of one or more detent surfaces is on said endface; one of said first and second sets of detent surfaces comprises one or more raised axially protruding ridges; the other of said first and second sets of detent surfaces comprises one or more axially recessed slots, each slot receiving a respective said ridge inserted axially thereinto in nested relation providing said engaged interaction in said interlocking mating keyed relation.

37. The coalescing filter element according to claim 36 comprising a plurality of said ridges extending laterally as spokes radially outwardly away from a central region at said axis.

38. The coalescing filter element according to claim 35 wherein: said second set of one or more detent surfaces is on said endface; one of said first and second sets of one or more detent surfaces comprises a raised axially protruding protrusion member having an outer periphery having a keyed shape; the other of said first and second sets of one or more detent surfaces comprises an axially recessed pocket having an inner periphery having a reception shape complemental to said keyed shape of said protrusion member and receiving said protrusion member inserted axially into said pocket in keyed relation.

39. The coalescing filter element according to claim 38 wherein said keyed shape is characterized by a perimeter having a nonuniform radius from said axis.

40. The coalescing filter element according to claim 35 wherein: said first set of one or more detent surfaces comprises a first set of gear teeth facing axially toward said second endcap; said second set of one or more detent surfaces comprises a second set of gear teeth on said endface and facing axially away from said second endcap and engaging said first set of gear teeth in driven relation.

41. The coalescing filter element according to claim 35 wherein said second set of one or more detent surfaces is on said outer sideface.

42. The coalescing filter element according to claim 41 wherein: said first set of one or more detent surfaces comprises a first set of gear teeth facing radially inwardly toward said second endcap; said second set of one or more detent surfaces comprises a second set of gear teeth on said outer sideface and facing radially outwardly away from said second endcap and engaging said first set of gear teeth in driven relation.

43. The coalescing filter element according to claim 31 wherein said coalescing filter element rotates about an axis and extends axially along said axis between first and second axial ends having respective first and second axial endcaps, said second axial endcap having an axial endface facing axially away from said first axial end, said second axial endcap having a peripheral outer sideface facing radially outwardly away from said axis, and an inner sideface facing radially inwardly toward said axis, said inner sideface being spaced radially outwardly of said axis and radially inwardly of said outer sideface, and wherein said second set of one or more detent surfaces is on at least one of said inner sideface, said endface, and said outer sideface.

44. The coalescing filter element according to claim 43 wherein said second set of one or more detent surfaces is on said inner sideface.

45. The coalescing filter element according to claim 44 wherein said first set of one or more detent surfaces on said rotary drive member engages said second set of one or more detent surfaces on said inner sideface in bayonet relation.

46. The coalescing filter element according to claim 43 wherein said inner sideface forms an axially recessed pocket in said second endcap, and said rotary drive member extends axially into said pocket.

47. The coalescing filter element according to claim 31 wherein one of said first and second sets of one or more detent surfaces comprises a pliable member on the respective one of said rotary drive member and said coalescing filter element and complementally pliably conforming to the other of said first and second sets of one or more detent surfaces.

48. The coalescing filter element according to claim 31 wherein said first and second sets of one or more detent surfaces engage each other in said interlocking mating keyed relation in a first engagement direction of rotation, and permit slippage in a second opposite direction of rotation.

49. The coalescing filter element according to claim 31 wherein said coalescing filter element rotates about an axis and extends axially along said axis between first and second axial ends having respective first and second axial endcaps, said coalescing filter element having an axially extending hollow interior, and comprising a third set of one or more detent surfaces on said rotary drive member, and a fourth set of one or more detent surfaces on said coalescing filter element, said rotary drive member comprising a rotary drive shaft extending axially through said second axial endcap and axially through said hollow interior and engaging said first axial endcap, said second set of one or more detent surfaces being on said second endcap, said fourth set of one or more detent surfaces being on said first endcap, said first and third sets of one or more detent surfaces being on said rotary drive shaft at axially spaced locations therealong, said first and second sets of one or more detent surfaces engaging each other in interlocking mating keyed relation as said rotary drive shaft extends through said second endcap, said third and fourth sets of one or more detent surfaces engaging each other in interlocking mating keyed relation as said rotary drive shaft engages said first endcap.

50. The coalescing filter element according to claim 49 wherein the axial extension of said rotary drive shaft through said hollow interior between said first and third sets of one or more detent surfaces respectively engaging said second and fourth sets of one or more detent surfaces on respective said endcaps provides an alignment coupler extending axially between said first and second endcaps and maintaining alignment thereof and preventing torsional twisting of said coalescer filter element therebetween.

51. The coalescing filter element according to claim 49 wherein each of said first, second, third and fourth sets of one or more detent surfaces has a polygonal shape providing said engaged interaction in said interlocking mating keyed relation.

52. The coalescing filter element according to claim 51 wherein said polygonal shape is hexagonal.

53. The coalescing filter element according to claim 49 wherein at least one of said first and second endcaps has a plurality of vanes extending axially into said hollow interior and extending radially outwardly from a central hub having an inner periphery providing one of said second and fourth sets of one or more detent surfaces engaging said rotary drive shaft.

54. The coalescing filter element according to claim 49 wherein: said first endcap has a first set of a plurality of vanes extending axially into said hollow interior toward said second endcap and extending radially outwardly from a first central hub having an inner periphery providing said fourth set of one or more detent surfaces; said second endcap has a second set of a plurality of vanes extending axially into said hollow interior toward said first endcap and extending radially outwardly from a second central hub having an inner periphery providing said second set of one or more detent surfaces.

55. The coalescing filter element according to claim 54 wherein said first and second sets of vanes extend axially towards each other and engage each other in said hollow interior.

56. The coalescing filter element according to claim 54 wherein the vanes of one of said sets have axially extending apertures therein, and the vanes of the other of said sets have axially extending rods which extend axially into said apertures.

57. The coalescing filter element according to claim 31 wherein said coalescing filter element rotates about an axis and extends axially along said axis between first and second axial ends having respective first and second axial endcaps, said coalescing filter element having an axially extending hollow interior, a torsional-resistance alignment coupler extending axially between said first and second endcaps and maintaining alignment thereof and preventing torsional twisting of said coalescer filter element therebetween.

58. The coalescing filter element according to claim 31 wherein said annular coalescer element has an annular shape selected from the group consisting of circular, oval, oblong, racetrack, pear, triangular, rectangular, and other closed-loop shapes.

59. The coalescing filter element according to claim 31 wherein said coalescing filter element is an aftermarket replacement coalescing filter element.

60. A gas-liquid rotating coalescer separating liquid from a gas-liquid mixture, comprising:

a coalescing filter assembly comprising a housing having an inlet receiving the gas-liquid mixture, a gas outlet discharging separated gas, and a drain outlet discharging separated liquid;

an annular rotating coalescing filter element in the housing, the filter element having an endcap;

a drive shaft;

a rotary drive member coupled to the drive shaft, the rotary drive member positioned between the drive shaft and the endcap when the annular rotating coalescing filter element is received in the housing;

a first set of one or more detent surfaces on the rotary drive member; and a second set of one or more detent surfaces on the endcap of the coalescing filter element, the second set of one or more detent surfaces engagingly interacting with the first set of one or more detent surfaces in interlocking mating keyed relation to effect rotation of the coalescing filter element by the rotary drive member, wherein the coalescing filter element rotates about an axis and extends axially along the axis between first and second axial ends having respective first and second axial endcaps, the coalescing filter element having an axially extending hollow interior, and comprising a third set of one or more detent surfaces on the rotary drive member, and a fourth set of one or more detent surfaces on the coalescing filter element, the rotary drive member comprising a rotary drive shaft extending axially through the second axial endcap and axially through the hollow interior and engaging the first axial endcap, the second set of one or more detent surfaces being on the second endcap, the fourth set of one or more detent surfaces being on the first endcap, the first and third sets of one or more detent surfaces being on the rotary drive shaft at axially spaced locations therealong, the first and second sets of one or more detent surfaces engaging each other in interlocking mating keyed relation as the rotary drive shaft extends through the second endcap, the third and fourth sets of one or more detent surfaces engaging each other in interlocking mating keyed relation as the rotary drive shaft engages the first endcap, and wherein the axial extension of the rotary drive shaft through the hollow interior between the first and third sets of one or more detent surfaces respectively engaging the second and fourth sets of one or more detent surfaces on respective the endcaps provides an alignment coupler extending axially between the first and second endcaps and maintaining alignment thereof and preventing torsional twisting of the coalescer filter element therebetween.

61. A coalescing filter element for a gas-liquid rotating coalescer separating liquid from a gas-liquid mixture in a coalescing filter assembly having a housing, the housing having an inlet receiving the gas-liquid mixture, a gas outlet discharging separated gas, and a drain outlet discharging separated liquid, the assembly including a rotary drive member coupled to a drive shaft, the rotary drive member having a first set of one or more detent surfaces, the coalescing filter element comprising:

an annular rotating coalescing filter element having an endcap such that the rotary drive member is positioned between the endcap and the drive shaft when the annular rotating coalescing filter element is positioned within the housing; and a second set of one or more detent surfaces on the endcap, the second set of one or more detent surfaces engagingly interacting with the first set of one or more detent surfaces in interlocking mating keyed relation to effect rotation of the coalescing filter element by the rotary drive member;

wherein designated operation of the gas-liquid rotating coalescer, including designated rotation of the coalescing filter element, requires the second set of one or more detent surfaces, including the engaged interaction with the first set of one or more detent surfaces in the interlocking mating keyed relation, whereby a coalescing filter element missing the second set of one or more detent surfaces will not affect effect the designated operation, wherein the coalescing filter element rotates about an axis and extends axially along the axis between first and second axial ends having respective first and second axial endcaps, the coalescing filter element having an axially extending hollow interior, and comprising a third set of one or more detent surfaces on the rotary drive member, and a fourth set of one or more detent surfaces on the coalescing filter element, the rotary drive member comprising a rotary drive shaft extending axially through the second axial endcap and axially through the hollow interior and engaging the first axial endcap, the second set of one or more detent surfaces being on the second endcap, the fourth set of one or more detent surfaces being on the first endcap, the first and third sets of one or more detent surfaces being on the rotary drive shaft at axially spaced locations therealong, the first and second sets of one or more detent surfaces engaging each other in interlocking mating keyed relation as the rotary drive shaft extends through the second endcap, the third and fourth sets of one or more detent surfaces engaging each other in interlocking mating keyed relation as the rotary drive shaft engages the first endcap, and wherein the axial extension of the rotary drive shaft through the hollow interior between the first and third sets of one or more detent surfaces respectively engaging the second and fourth sets of one or more detent surfaces on respective the endcaps provides an alignment coupler extending axially between the first and second endcaps and maintaining alignment thereof and preventing torsional twisting of the coalescer filter element therebetween.

62. A gas-liquid rotating coalescer separating liquid from a gas-liquid mixture, comprising:

a coalescing filter assembly comprising a housing having an inlet receiving the gas-liquid mixture, a gas outlet discharging separated gas, and a drain outlet discharging separated liquid;

an annular rotating coalescing filter element in the housing, the filter element having an endcap;

a drive shaft;

a rotary drive member coupled to the drive shaft, the rotary drive member positioned between the drive shaft and the endcap when the annular rotating coalescing filter element is received in the housing;

a first set of one or more detent surfaces on the rotary drive member; and a second set of one or more detent surfaces on the endcap of the coalescing filter element, the second set of one or more detent surfaces engagingly interacting with the first set of one or more detent surfaces in interlocking mating keyed relation to effect rotation of the coalescing filter element by the rotary drive member;

wherein the coalescing filter element rotates about an axis and extends axially along the axis between first and second axial ends having respective first and second axial endcaps, the coalescing filter element having an axially extending hollow interior, and comprising a third set of one or more detent surfaces on the rotary drive member, and a fourth set of one or more detent surfaces on the coalescing filter element, the rotary drive member comprising a rotary drive shaft extending axially through the second axial endcap and axially through the hollow interior and engaging the first axial endcap, the second set of one or more detent surfaces being on the second endcap, the fourth set of one or more detent surfaces being on the first endcap, the first and third sets of one or more detent surfaces being on the rotary drive shaft at axially spaced locations therealong, the first and second sets of one or more detent surfaces engaging each other in interlocking mating keyed relation as the rotary drive shaft extends through the second endcap, the third and fourth sets of one or more detent surfaces engaging each other in interlocking mating keyed relation as the rotary drive shaft engages the first endcap, wherein the each of the first, second, third and fourth sets of one or more detent surfaces has a polygonal shape providing the engaged interaction in the interlocking mating keyed relation, and wherein at least one of the first and second endcaps has a plurality of vanes extending axially into the hollow interior and extending radially outwardly from a central hub having an inner periphery providing one of the second and fourth sets of one or more detent surfaces engaging the rotary drive shaft.

63. A coalescing filter element for a gas-liquid rotating coalescer separating liquid from a gas-liquid mixture in a coalescing filter assembly having a housing, the housing having an inlet receiving the gas-liquid mixture, a gas outlet discharging separated gas, and a drain outlet discharging separated liquid, the assembly including a rotary drive member coupled to a drive shaft, the rotary drive member having a first set of one or more detent surfaces, the coalescing filter element comprising:

an annular rotating coalescing filter element having an endcap such that the rotary drive member is positioned between the endcap and the drive shaft when the annular rotating coalescing filter element is positioned within the housing; and a second set of one or more detent surfaces on the endcap, the second set of one or more detent surfaces engagingly interacting with the first set of one or more detent surfaces in interlocking mating keyed relation to effect rotation of the coalescing filter element by the rotary drive member;

wherein designated operation of the gas-liquid rotating coalescer, including designated rotation of the coalescing filter element, requires the second set of one or more detent surfaces, including the engaged interaction with the first set of one or more detent surfaces in the interlocking mating keyed relation, whereby a coalescing filter element missing the second set of one or more detent surfaces will not affect effect the designated operation;

wherein the coalescing filter element rotates about an axis and extends axially along the axis between first and second axial ends having respective first and second axial endcaps, the coalescing filter element having an axially extending hollow interior, and comprising a third set of one or more detent surfaces on the rotary drive member, and a fourth set of one or more detent surfaces on the coalescing filter element, the rotary drive member comprising a rotary drive shaft extending axially through the second axial endcap and axially through the hollow interior and engaging the first axial endcap, the second set of one or more detent surfaces being on the second endcap, the fourth set of one or more detent surfaces being on the first endcap, the first and third sets of one or more detent surfaces being on the rotary drive shaft at axially spaced locations therealong, the first and second sets of one or more detent surfaces engaging each other in interlocking mating keyed relation as the rotary drive shaft extends through the second endcap, the third and fourth sets of one or more detent surfaces engaging each other in interlocking mating keyed relation as the rotary drive shaft engages the first endcap, wherein each of the first, second, third and fourth sets of one or more detent surfaces has a polygonal shape providing the engaged interaction in the interlocking mating keyed relation, and wherein at least one of the first and second endcaps has a plurality of vanes extending axially into the hollow interior and extending radially outwardly from a central hub having an inner periphery providing one of the second and fourth sets of one or more detent surfaces engaging the rotary drive shaft.

64. A gas-liquid rotating coalescer separating liquid from a gas-liquid mixture, comprising:

a coalescing filter assembly comprising a housing having an inlet receiving the gas-liquid mixture, a gas outlet discharging separated gas, and a drain outlet discharging separated liquid;

an annular rotating coalescing filter element in the housing, the filter element having an endcap;

a drive shaft;

a rotary drive member coupled to the drive shaft, the rotary drive member positioned between the drive shaft and the endcap when the annular rotating coalescing filter element is received in the housing;

a first set of one or more detent surfaces on the rotary drive member; and a second set of one or more detent surfaces on the endcap of the coalescing filter element, the second set of one or more detent surfaces engagingly interacting with the first set of one or more detent surfaces in interlocking mating keyed relation to effect rotation of the coalescing filter element by the rotary drive member;

wherein the coalescing filter element rotates about an axis and extends axially along the axis between first and second axial ends having respective first and second axial endcaps, the coalescing filter element having an axially extending hollow interior, and comprising a third set of one or more detent surfaces on the rotary drive member, and a fourth set of one or more detent surfaces on the coalescing filter element, the rotary drive member comprising a rotary drive shaft extending axially through the second axial endcap and axially through the hollow interior and engaging the first axial endcap, the second set of one or more detent surfaces being on the second endcap, the fourth set of one or more detent surfaces being on the first endcap, the first and third sets of one or more detent surfaces being on the rotary drive shaft at axially spaced locations therealong, the first and second sets of one or more detent surfaces engaging each other in interlocking mating keyed relation as the rotary drive shaft extends through the second endcap, the third and fourth sets of one or more detent surfaces engaging each other in interlocking mating keyed relation as the rotary drive shaft engages the first endcap, wherein the each of the first, second, third and fourth sets of one or more detent surfaces has a polygonal shape providing the engaged interaction in the interlocking mating keyed relation, and wherein the first endcap has a first set of a plurality of vanes extending axially into the hollow interior toward the second endcap and extending radially outwardly from a first central hub having an inner periphery providing the fourth set of one or more detent surfaces, and the second endcap has a second set of a plurality of vanes extending axially into the hollow interior toward the first endcap and extending radially outwardly from a second central hub having an inner periphery providing the second set of one or more detent surfaces.

65. The gas-liquid rotating coalescer according to claim 64 wherein the first and second sets of vanes extend axially towards each other and engage each other in the hollow interior.

66. The gas-liquid rotating coalescer according to claim 64 wherein the vanes of one of the sets have axially extending apertures therein, and the vanes of the other of the sets have axially extending rods which extend axially into the apertures.

67. A coalescing filter element for a gas-liquid rotating coalescer separating liquid from a gas-liquid mixture in a coalescing filter assembly having a housing, the housing having an inlet receiving the gas-liquid mixture, a gas outlet discharging separated gas, and a drain outlet discharging separated liquid, the assembly including a rotary drive member coupled to a drive shaft, the rotary drive member having a first set of one or more detent surfaces, the coalescing filter element comprising:

an annular rotating coalescing filter element having an endcap such that the rotary drive member is positioned between the endcap and the drive shaft when the annular rotating coalescing filter element is positioned within the housing; and a second set of one or more detent surfaces on the endcap, the second set of one or more detent surfaces engagingly interacting with the first set of one or more detent surfaces in interlocking mating keyed relation to effect rotation of the coalescing filter element by the rotary drive member;

wherein designated operation of the gas-liquid rotating coalescer, including designated rotation of the coalescing filter element, requires the second set of one or more detent surfaces, including the engaged interaction with the first set of one or more detent surfaces in the interlocking mating keyed relation, whereby a coalescing filter element missing the second set of one or more detent surfaces will not affect effect the designated operation;

wherein the coalescing filter element rotates about an axis and extends axially along the axis between first and second axial ends having respective first and second axial endcaps, the coalescing filter element having an axially extending hollow interior, and comprising a third set of one or more detent surfaces on the rotary drive member, and a fourth set of one or more detent surfaces on the coalescing filter element, the rotary drive member comprising a rotary drive shaft extending axially through the second axial endcap and axially through the hollow interior and engaging the first axial endcap, the second set of one or more detent surfaces being on the second endcap, the fourth set of one or more detent surfaces being on the first endcap, the first and third sets of one or more detent surfaces being on the rotary drive shaft at axially spaced locations therealong, the first and second sets of one or more detent surfaces engaging each other in interlocking mating keyed relation as the rotary drive shaft extends through the second endcap, the third and fourth sets of one or more detent surfaces engaging each other in interlocking mating keyed relation as the rotary drive shaft engages the first endcap, wherein each of the first, second, third and fourth sets of one or more detent surfaces has a polygonal shape providing the engaged interaction in the interlocking mating keyed relation, and wherein the first endcap has a first set of a plurality of vanes extending axially into the hollow interior toward the second endcap and extending radially outwardly from a first central hub having an inner periphery providing the fourth set of one or more detent surfaces, and the second endcap has a second set of a plurality of vanes extending axially into the hollow interior toward the first endcap and extending radially outwardly from a second central hub having an inner periphery providing the second set of one or more detent surfaces.

68. The coalescing filter element according to claim 67 wherein the first and second sets of vanes extend axially towards each other and engage each other in the hollow interior.

69. The coalescing filter element according to claim 67 wherein the vanes of one of the sets have axially extending apertures therein, and the vanes of the other of the sets have axially extending rods which extend axially into the apertures.

70. A gas-liquid rotating coalescer separating liquid from a gas-liquid mixture, comprising:

a coalescing filter assembly comprising a housing having an inlet receiving the gas-liquid mixture, a gas outlet discharging separated gas, and a drain outlet discharging separated liquid;

an annular rotating coalescing filter element in the housing, the filter element having an endcap;

a drive shaft;

a rotary drive member coupled to the drive shaft, the rotary drive member positioned between the drive shaft and the endcap when the annular rotating coalescing filter element is received in the housing;

a first set of one or more detent surfaces on the rotary drive member; and a second set of one or more detent surfaces on the endcap of the coalescing filter element, the second set of one or more detent surfaces engagingly interacting with the first set of one or more detent surfaces in interlocking mating keyed relation to effect rotation of the coalescing filter element by the rotary drive member, wherein the coalescing filter element rotates about an axis and extends axially along the axis between first and second axial ends having respective first and second axial endcaps, the coalescing filter element having an axially extending hollow interior, a torsional-resistance alignment coupler extending axially between the first and second endcaps and maintaining alignment thereof and preventing torsional twisting of the coalescer filter element therebetween.

71. A coalescing filter element for a gas-liquid rotating coalescer separating liquid from a gas-liquid mixture in a coalescing filter assembly having a housing, the housing having an inlet receiving the gas-liquid mixture, a gas outlet discharging separated gas, and a drain outlet discharging separated liquid, the assembly including a rotary drive member coupled to a drive shaft, the rotary drive member having a first set of one or more detent surfaces, the coalescing filter element comprising:

an annular rotating coalescing filter element having an endcap such that the rotary drive member is positioned between the endcap and the drive shaft when the annular rotating coalescing filter element is positioned within the housing; and a second set of one or more detent surfaces on the endcap, the second set of one or more detent surfaces engagingly interacting with the first set of one or more detent surfaces in interlocking mating keyed relation to effect rotation of the coalescing filter element by the rotary drive member, wherein designated operation of the gas-liquid rotating coalescer, including designated rotation of the coalescing filter element, requires the second set of one or more detent surfaces, including the engaged interaction with the first set of one or more detent surfaces in the interlocking mating keyed relation, whereby a coalescing filter element missing the second set of one or more detent surfaces will not affect effect the designated operation, and wherein the coalescing filter element rotates about an axis and extends axially along the axis between first and second axial ends having respective first and second axial endcaps, the coalescing filter element having an axially extending hollow interior, a torsional-resistance alignment coupler extending axially between the first and second endcaps and maintaining alignment thereof and preventing torsional twisting of the coalescer filter element therebetween.

* * * * *